(12) United States Patent
Takahashi et al.

(10) Patent No.: US 11,135,825 B2
(45) Date of Patent: Oct. 5, 2021

(54) METAL/FIBER-REINFORCED RESIN MATERIAL COMPOSITE BODY AND METHOD FOR PRODUCING SAME

(71) Applicant: NIPPON STEEL Chemical & Material Co., Ltd., Tokyo (JP)

(72) Inventors: Hiroyuki Takahashi, Tokyo (JP); Hideki Andoh, Tokyo (JP)

(73) Assignee: NIPPON STEEL Chemical & Material Co., Ltd., Tokyo (JP)

( * ) Notice: Subject to any disclaimer, the term of this patent is extended or adjusted under 35 U.S.C. 154(b) by 177 days.

(21) Appl. No.: 16/498,383

(22) PCT Filed: Mar. 31, 2018

(86) PCT No.: PCT/JP2018/014021
§ 371 (c)(1),
(2) Date: Sep. 26, 2019

(87) PCT Pub. No.: WO2018/182038
PCT Pub. Date: Oct. 4, 2018

(65) Prior Publication Data
US 2021/0107269 A1   Apr. 15, 2021

(30) Foreign Application Priority Data
Mar. 31, 2017 (JP) .............................. JP2017-073196

(51) Int. Cl.
*B32B 38/08* (2006.01)
*B32B 37/24* (2006.01)
(Continued)

(52) U.S. Cl.
CPC ............ *B32B 37/24* (2013.01); *B29C 66/742* (2013.01); *B32B 15/088* (2013.01);
(Continued)

(58) Field of Classification Search
CPC ........ B29C 66/91933; B29C 66/72321; B29C 66/7392; B29C 66/742; B29C 43/203; B32B 38/08; B32B 37/04
See application file for complete search history.

(56) References Cited

U.S. PATENT DOCUMENTS

| 5,756,206 A | 5/1998 | Davies et al. |
| 2009/0242248 A1* | 10/2009 | Sohn ................ B32B 27/20 |
| | | 174/258 |

(Continued)

FOREIGN PATENT DOCUMENTS

| CN | 103237646 | 8/2013 |
| JP | H02220841 | 9/1990 |

(Continued)

OTHER PUBLICATIONS

"International Search Report (Form PCT/ISA/210) of PCT/JP2018/014021," dated Jul. 3, 2018, with English translation thereof, pp. 1-3.

(Continued)

*Primary Examiner* — Scott W Dodds
(74) *Attorney, Agent, or Firm* — JCIPRNET

(57) ABSTRACT

According to the present invention, a surface of a prepreg (104), said surface being provided with a partially fused structure (102A), and a surface of a metal member (110) are brought into contact with each other, and heat and pressure are subsequently applied thereto. After completely melting a resin containing a thermoplastic resin and adhering to the prepreg (104) so that a reinforcing fiber substrate (101) is impregnated with the molten resin, the resin is cured to (Continued)

obtain a matrix resin (105), thereby forming a CFRP layer (120) that serves as a fiber-reinforced resin material, and the CFRP layer is simultaneously compression-bonded to the metal member (110), so that a metal-CFRP composite body (100) in which the CFRP layer (120) and the metal member (110) are firmly bonded to each other is formed.

14 Claims, 5 Drawing Sheets

(51) Int. Cl.
    *B32B 15/088*     (2006.01)
    *B32B 15/092*     (2006.01)
    *B32B 15/18*     (2006.01)
    *B29C 65/00*     (2006.01)
    *B32B 15/08*     (2006.01)
    *B32B 37/04*     (2006.01)
    *B32B 15/14*     (2006.01)
    *B29C 43/20*     (2006.01)

(52) U.S. Cl.
    CPC ............ *B32B 15/092* (2013.01); *B32B 15/18* (2013.01); *B29C 43/203* (2013.01); *B29C 66/72321* (2013.01); *B29C 66/7392* (2013.01); *B29C 66/91933* (2013.01); *B32B 15/08* (2013.01); *B32B 15/14* (2013.01); *B32B 37/04* (2013.01); *B32B 38/08* (2013.01); *B32B 2260/021* (2013.01); *B32B 2260/046* (2013.01); *B32B 2262/106* (2013.01)

(56) References Cited

U.S. PATENT DOCUMENTS

2015/0030864 A1*   1/2015   Takeuchi ............ B29C 65/5057
                                                  428/458
2017/0021560 A1*   1/2017   Klemt .................. B29C 66/721

FOREIGN PATENT DOCUMENTS

| | | |
|---|---|---|
| JP | H04272813 | 9/1992 |
| JP | H10305523 | 11/1998 |
| JP | 2006297929 | 11/2006 |
| JP | 2011240620 | 12/2011 |
| JP | 2015020364 | 2/2015 |
| JP | 2015212085 | 11/2015 |
| JP | 2015536850 | 12/2015 |
| JP | 2016003257 | 1/2016 |
| JP | 5999721 | 9/2016 |
| TW | 201706476 | 2/2017 |
| WO | 2009116484 | 9/2009 |
| WO | 2016152856 | 9/2016 |

OTHER PUBLICATIONS

Holty, D.W., et al., "Variables Affecting the Physical Properties of Consolidated Flexible Power-Coated Towpregs," 38th International SAMPE Symposium, May 1993, pp. 1916-1929.
"Office Action of China Counterpart Application", dated Dec. 8, 2020, with English translation thereof, p. 1-p. 12.
"Search Report of Europe Counterpart Application", dated Nov. 27, 2020, p. 1-p. 8.
Office Action of Taiwan Counterpart Application, with English translation thereof, dated Jul. 20, 2021, pp. 1-20.

* cited by examiner

METAL/FIBER-REINFORCED RESIN MATERIAL COMPOSITE BODY AND METHOD FOR PRODUCING SAME

CROSS-REFERENCE TO RELATED APPLICATION

This application is a 371 application of the international PCT application serial no. PCT/JP2018/014021, filed on Mar. 31, 2018, which claims the priority benefit of Japan application no. 2017-073196, filed on Mar. 31, 2017. The entirety of each of the abovementioned patent applications is hereby incorporated by reference herein and made a part of this specification.

TECHNICAL FIELD

The present invention relates to a metal/fiber-reinforced resin material composite body in which a metal member and a fiber-reinforced resin material are laminated and a method for producing the same.

BACKGROUND ART

A fiber-reinforced plastic (FRP) including reinforcing fibers such as glass fibers and carbon fibers and a matrix resin is widely used in consumer products and for industrial uses because it is lightweight and has excellent mechanical characteristics. In particular, in the automobile industry, since the reduction in weight of a vehicle body most contributes to improvement in performance and fuel consumption, replacement of steel materials mainly used so far with a carbon fiber-reinforced plastic (CFRP) or a composite material of a metal member and a CFRP is being actively investigated.

In production of components and structures in which a CFRP and a metal member are combined, in order to integrate a plurality of members, a step of bonding members or materials is required, and a bonding method using an epoxy resin-based thermosetting adhesive is generally known.

In addition, in recent years, in order to improve processability and recyclability, a thermoplastic resin has also been considered as a matrix resin of a fiber-reinforced resin material.

For example, Patent Literature 1 and Patent Literature 2 disclose technologies in which a bonding surface of a metal member is subjected to a surface roughening treatment so that it has specific surface shape parameters, a hard and highly crystalline thermoplastic resin is injected and molded, an epoxy resin adhesive layer is provided on the metal member, and thus the adhesive strength between the metal member and a CFRP is improved. However, in these technologies, a roughened surface of the metal member that is chemically etched so that it has a special surface microstructure is filled with a hard and highly crystalline thermoplastic resin, and thus strength is exhibited. Therefore, in combining, there are productivity and cost problems because a high temperature process is necessary due to the problem of a melt viscosity and a high melting point in addition to a specific treatment that needs to be performed for roughening and rust prevention.

Patent Literature 3 discloses that an adhesive resin such as an epoxy resin is impregnated into a surface of a carbon fiber substrate bonded to a metal member, a thermoplastic resin is impregnated into another surface, and a composite body of a reinforcing fiber substrate and a metal is formed as a prepreg. According to this method, it is possible to provide an integrated molding product having strong bonding strength even in bonding of different members such as a fiber-reinforced resin material and a metal member. However, in this method, an epoxy thermosetting resin is used as an adhesive layer, and also the bondability between a fiber-reinforced sheet and a metal layer is maintained by reinforcing fibers penetrating into the adhesive layer. Therefore, it is necessary to use a non-woven fabric including fibers with a specific length as a reinforcing fiber substrate, and the reinforcement effect is limited compared to a unidirectional fiber-reinforced material and a cloth material.

In addition, Patent Literature 4 discloses a method for producing a sandwich structure with a steel plate using a CFRP molding material using a polyurethane resin matrix. Regarding the material in this literature, good moldability of a thermoplastic polyurethane resin is used, a crosslinking reaction is caused in a polyurethane resin according to after-curing to form a thermosetting resin, and thus the strength becomes higher. However, since the polyurethane resin has low heat resistance, it has problems in that it is difficult to apply it to a member exposed to a high temperature and its uses are limited.

In addition, Patent Literature 5 discloses that a powder of a resin composition including a phenoxy resin or a mixture in which a crystalline epoxy resin and an acid anhydride as a crosslinking agent are added to a phenoxy resin is applied to a reinforcing fiber substrate by a powder coating method to produce a prepreg, and the prepreg is molded and cured to obtain a CFRP by being heated and pressed. In addition, Patent Literature 5 also suggests that an aluminum foil or a stainless steel foil can be laminated on a CFRP. However, in Patent Literature 5, since there is no example of a composite body of a CFRP and a metal member, the mechanical strength such as the bending strength for the composite body is not examined.

In addition, Patent Literature 6 proposes a method for producing a structural component for a vehicle body in which a composite material including a flat carrier material composed of a metal and a fiber-reinforced thermoplastic material and a support material composed of a thermoplastic material is heated, a rib structure is formed in the support material, and the carrier material is molded into a three-dimensional component.

In addition, Patent Literature 7 proposes a fiber-reinforced resin intermediate material which is used by being heated and pressurized in a lamination state, and in which a reinforcing fiber substrate has voids opening to the outer surface, and a resin in the form of powder is in a semi-impregnated state.

REFERENCE LIST

Patent Literature

Patent Literature 1: PCT International Publication No. WO2009/116484
Patent Literature 2: Japanese Unexamined Patent Application Publication No. 2011-240620
Patent Literature 3: Japanese Unexamined Patent Application Publication No. 2016-3257
Patent Literature 4: Japanese Unexamined Patent Application Publication No. 2015-212085
Patent Literature 5: PCT International Publication No. WO2016/152856
Patent Literature 6: Published Japanese Translation No. 2015-536850 of the PCT International Publication
Patent Literature 7: Japanese Patent No. 5999721

SUMMARY

Technical Problem

In a composite material of a metal member and a fiber-reinforced resin material, in order to secure sufficient mechanical strength and durability, two points are particularly important: the first point is increasing the strength of a fiber-reinforced resin material itself, and the second point is increasing the adhesive force between the metal member and the fiber-reinforced resin material.

Regarding the first point, when impregnation of the resin into the reinforcing fiber substrate is insufficient, voids and the like generated, and the mechanical strength of the fiber-reinforced resin material tends to be insufficient. Regarding this point, in Patent Literature 7, the impregnation of the resin into the reinforcing fiber substrate is examined. That is, in Patent Literature 7, according to a fiber-reinforced resin intermediate material in a semi-impregnated state, even if a thermoplastic resin having a higher viscosity than a thermosetting resin is used, the impregnation of the resin into the reinforcing fiber substrate increases, and a fiber-reinforced resin material in which defects such as voids are unlikely to occur and which has excellent shaping ability is obtained. However, the second point, that is, the adhesion between the metal member and the fiber-reinforced resin material, has not been investigated in the related art, including Patent Literature 7.

In addition, it is thought that, in order to reduce the number of processes of producing a metal/fiber-reinforced resin material composite body and improve the throughput, it is effective to simultaneously perform molding of the metal member at the same time when the metal member and the prepreg of the fiber-reinforced resin material are bonded. Even when such a batch process is performed, it is important to secure the strength of the fiber-reinforced resin material itself as the first point and the adhesive force between the metal member and the fiber-reinforced resin material as the second point.

An object of the present invention is to provide a metal/fiber-reinforced resin material composite body in which a thermoplastic resin is used as a matrix resin of a fiber-reinforced resin material, the fiber-reinforced resin material itself has sufficient mechanical strength, a metal member and the fiber-reinforced resin material are firmly bonded, and the durability is excellent, and to provide a method for producing a metal/fiber-reinforced resin material composite body through which molding is possible at the same time when the metal/fiber-reinforced resin material composite body is produced.

Solution to Problem

In the method for producing a metal/fiber-reinforced resin material composite body of the present invention, the metal/fiber-reinforced resin material composite body includes a metal member and a fiber-reinforced resin material which is laminated on at least one surface of the metal member and includes a reinforcing fiber substrate and a resin including a thermoplastic resin impregnated into the reinforcing fiber substrate as a matrix resin.

The method for producing a metal/fiber-reinforced resin material composite body of the present invention includes the following step A and step B:

step A: forming a prepreg in which a partially fused structure of a resin including the thermoplastic resin is formed on at least one surface of the reinforcing fiber substrate; and step B: performing a heat and pressure treatment when a surface on which the partially fused structure of the prepreg is formed is brought into contact with a surface of the metal member; and at the same time in which the resin including the thermoplastic resin is completely melted and wet and spreads on the surface of the metal member and the resin including the thermoplastic resin is impregnated into the reinforcing fiber substrate, thereby forming a metal/fiber-reinforced resin material composite body, wherein the fiber-reinforced resin material and the metal member are bonded to form a metal/fiber-reinforced resin material composite body.

In the method for producing a metal/fiber-reinforced resin material composite body of the present invention, the step A of forming the prepreg may include the following step a and step b:

step a: forming a metal/fiber-reinforced resin material composite body by impregnating into the reinforcing fiber substrate, wherein a fine powder of a resin including a thermoplastic resin that is a solid at room temperature to at least one surface of a sheet-like reinforcing fiber substrate by a powder coating method; and step b: performing a heat treatment to the resin-adhered fiber substrate, and forming a prepreg having the partially fused structure by solidifying after the fine powder of the resin including the thermoplastic resin is incompletely melted.

In the method for producing a metal/fiber-reinforced resin material composite body of the present invention, the heat treatment in the step b may be performed in a temperature range of 100 to 400° C. for 30 seconds or longer and shorter than 3 minutes.

In the method for producing a metal/fiber-reinforced resin material composite body of the present invention, a fine powder of a resin including the thermoplastic resin that is a solid at room temperature may be adhered to at least one surface of a sheet-like reinforcing fiber substrate heated to a predetermined temperature by a powder coating method, and a prepreg having the partially fused structure may be formed by solidifying after the fine powder of the resin including the thermoplastic resin is incompletely melted.

In the method for producing a metal/fiber-reinforced resin material composite body of the present invention, an average particle size of a fine powder of the resin including the thermoplastic resin may be in a range of 10 to 100 μm.

In the method for producing a metal/fiber-reinforced resin material composite body of the present invention, in the prepreg, based on an end surface of the reinforcing fiber substrate in which a partially fused structure is formed using a the resin including the thermoplastic resin, 10 weight % or more of the resin including the thermoplastic resin may be adhered in a range of 0 to 50% in a thickness direction with respect to the thickness of the reinforcing fiber substrate.

In the method for producing a metal/fiber-reinforced resin material composite body of the present invention, an air permeability of the prepreg in a thickness direction may be in a range of 500 to 1,000 cc/cm$^2$/sec when the thickness is 40 to 200 μm.

In the method for producing a metal/fiber-reinforced resin material composite body of the present invention, in the step B, a resin layer having a thickness of 20 μm or less and a fiber content of 5 weight % or less may be formed using the resin including the thermoplastic resin between the surface of the metal member and the reinforcing fiber substrate as a part of the fiber-reinforced resin material.

In the method for producing a metal/fiber-reinforced resin material composite body of the present invention, the heat and pressure treatment in the step B may be performed in a temperature range of 100 to 400° C. and a pressure range of 3 MPa or more, for 3 minutes or longer.

In the method for producing a metal/fiber-reinforced resin material composite body of the present invention, simultaneously with the heat and pressure treatment, three-dimensional molding of the metal member and the prepreg may be performed.

In the method for producing a metal/fiber-reinforced resin material composite body of the present invention, a heating temperature in the heat and pressure treatment may be in a range of 180 to 240° C., and simultaneously with the heat and pressure treatment, a resin including the thermoplastic resin may be crosslinked to form a crosslinked cured product.

In the method for producing a metal/fiber-reinforced resin material composite body of the present invention, the glass transition temperature (Tg) of the resin before the crosslinking may be 150° C. or lower, but the glass transition temperature (Tg) of the crosslinked cured product may be 160° C. or higher.

A metal/fiber-reinforced resin material composite body of the present invention includes a metal member and a fiber-reinforced resin material which is laminated on at least one surface of the metal member and includes a reinforcing fiber substrate and a matrix resin covering the reinforcing fiber substrate. In the metal/fiber-reinforced resin material composite body of the present invention, as a part of the fiber-reinforced resin material, a resin layer having a thickness of 20 µm or less and a fiber content of 5 weight % or less is formed using a resin including the thermoplastic resin between the surface of the metal member and the reinforcing fiber substrate.

Advantageous Effects of Invention

According to the present invention, the metal member and the fiber-reinforced resin material having sufficient mechanical strength are firmly bonded with high adhesive strength, and it is possible to produce a metal/fiber-reinforced resin material composite body having excellent mechanical strength and durability in a simple process.

In addition, when the metal member and the fiber-reinforced resin material are combined, since molding of the metal member due to heating and pressing is possible at the same time, it is possible to reduce the number of production processes and the cost is also low.

Therefore, the metal/fiber-reinforced resin material composite body of the present invention can be appropriately used as a lightweight and high-strength material not only for housings of electrical and electronic devices but also structural members in applications of automobile members, aircraft members, and the like.

DESCRIPTION OF THE EMBODIMENTS

Embodiments of the present invention will be appropriately described below in detail with reference to the drawings.

[Method for Producing Metal-CFRP Composite Body]

Figure 1:
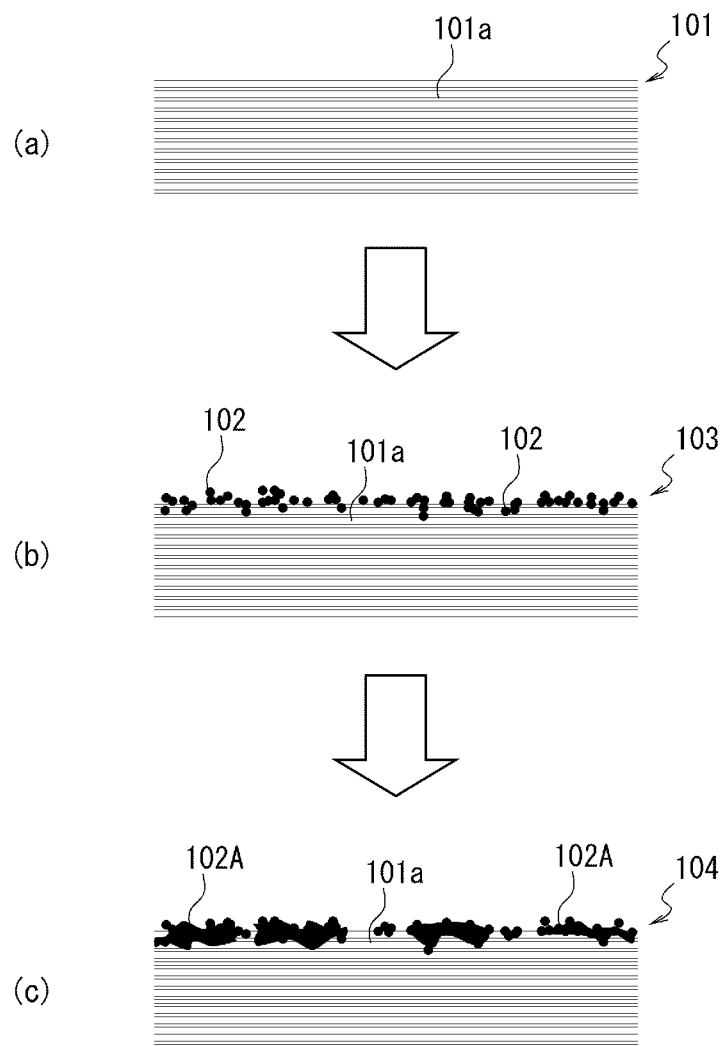
FIG. 1 shows schematic diagrams of producing steps of producing a metal-CFRP composite body according to an embodiment of the present invention.
Figure 2:
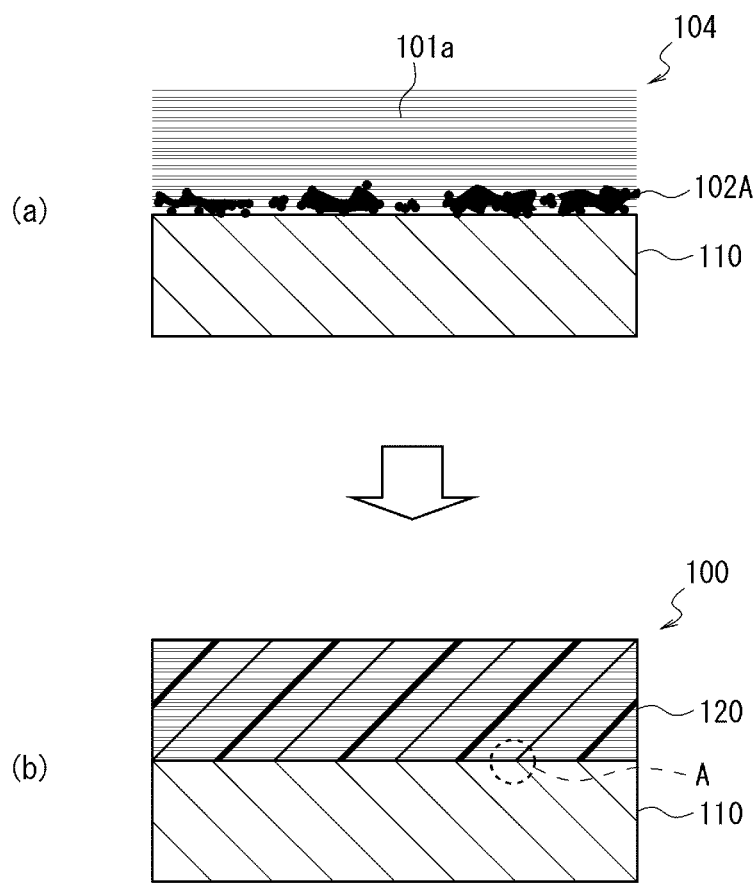
FIG. 2 shows schematic diagrams of producing steps following FIG. 1.
Figure 3:
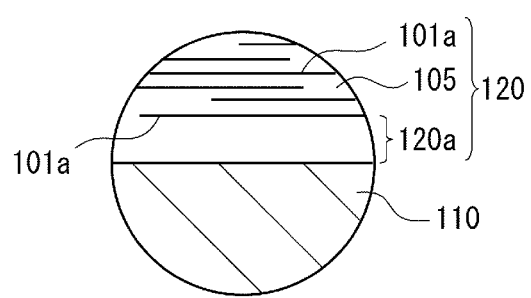
FIG. 3 is a diagram schematically showing an enlarged part A in FIG. 2.

FIG. 1 and FIG. 2 are schematic diagrams showing main steps of a method for producing a metal-CFRP composite body according to an embodiment of the present invention. In addition, FIG. 3 shows an enlarged part A enclosed with a dashed line in FIG. 2. First, as shown in (b) of FIG. 2, a metal-CFRP composite body 100 obtained by a production method of the present embodiment includes a metal member 110 and a CFRP layer 120 as a fiber-reinforced resin material. In addition, in the enlarged metal-CFRP composite body 100 shown in FIG. 3, the CFRP layer 120 includes a matrix resin 105 and a carbon fiber 101a which is a composite reinforcing fiber contained in the matrix resin 105. In addition, a resin layer 120a is formed in the vicinity of a boundary in which the CFRP layer 120 is in contact with the metal member 110. Here, the CFRP layer 120 is not limited to a single layer, and a plurality of layers may be laminated, and it may be formed not only on one surface of the metal member 110 but may also be formed on both surfaces thereof. In addition, the metal member 110 may be provided on both surfaces of the CFRP layer 120.

The method of the present invention includes the following step A and step B.

<Step A>

The step A is a step of forming a prepreg 104 in which a partially fused structure 102A of a resin including a thermoplastic resin is formed on at least one surface of a reinforcing fiber substrate 101 made of the carbon fiber 101a. The step A can be performed according to, for example, the following method 1 or method 2.

(Method 1)

The method 1 includes the following step a and step b.

Step a:

In the step a, as shown in (a) and (b) of FIG. 1, a fine powder 102 of a resin (hereinafter referred to as a "raw material resin" in some cases) including a thermoplastic resin that is a solid at room temperature is adhered to at least one surface of a sheet-like reinforcing fiber substrate 101 according to a powder coating method, and thereby a resin-adhered fiber substrate 103 is formed. In the powder coating method, since the raw material resin is fine particles, it is easy to melt, and since there are appropriate voids in a coating film after coating, they become air flow paths and voids are unlikely to be generated. In the step B to be described below, when the prepreg 104 and the metal member 110 are subjected to thermocompression bonding, the resin melted on the surface of the prepreg first quickly wets and spreads on the surface of the metal member 110 and then impregnates into the reinforcing fiber substrate 101. Therefore, compared to a melt impregnation method and a film stacking method in the related art, defects caused by insufficient wettability of the resin melted on the surface of the metal member 110 are unlikely to occur. That is, in the melt impregnation method in which adhesion to the metal member 110 is performed using the resin extruded from the reinforcing fiber substrate 101, in the produced prepreg, the wettability of the melted resin on the surface of the metal member 110 tends to be insufficient. In the film stacking method, for example, voids caused when it is difficult to impregnate the resin into the reinforcing fiber substrate 101 in the thickness direction easily occur, but these problems can be avoided in the powder coating method.

Examples of main powder coating methods include an electrostatic coating method, a fluid bed method, and a suspension method. Among these, the electrostatic coating method and the fluid bed method are methods suitable for a thermoplastic resin, and are preferable because the step is simple and the productivity is favorable. In particular, the electrostatic coating method is the most preferable method because uniformity of adhesion of the fine powder 102 of a raw material resin to the reinforcing fiber substrate 101 is favorable.

Here, (b) of FIG. 1 shows a state in which the fine powder 102 of a raw material resin adheres to one surface of the resin-adhered fiber substrate 103, but the fine powder 102 may adhere to both surfaces of the resin-adhered fiber substrate 103.

(Thermoplastic Resin)

Regarding the thermoplastic resin, properties thereof such as crystallinity and non-crystallinity are not particularly limited. For example, one or more of thermoplastic aromatic polyesters such as a phenoxy resin, a thermoplastic epoxy resin, a polyolefin and acid-modified products thereof, polystyrene, polymethyl methacrylate, acrylonitrile-styrene (AS) resin, acrylonitrile butadiene styrene (ABS) resin, polyethylene terephthalate and polybutylene terephthalate, and thermoplastic resins such as polycarbonate, polyimide, polyamide, polyamideimide, polyetherimide, polyether sulfone, polyphenylene ether and modified products thereof, polyphenylene sulfide, polyoxymethylene, polyarylate, polyether ketone, polyether ether ketone, and polyether ketone can be used.

Among these, a phenoxy resin, a thermoplastic epoxy resin, a polyamide, and a polycarbonate are preferably used because powders thereof can be relatively easily produced or obtained.

Here, the "thermoplastic resin" also includes a resin in the form of a crosslinked cured product to be described below. In addition, the "resin including a thermoplastic resin" may include a thermosetting resin as a resin component in addition to the thermoplastic resin. However, in this case, the thermoplastic resin is preferably a main component. Here, the "main component" refers to a component of which 50 parts by weight or more is contained with respect to 100 parts by weight of resin components. In addition, the "resin component" includes a thermoplastic resin and a thermosetting resin, but does not include a non-resin component such as a crosslinking agent. Regarding the thermosetting resin, for example, one or more selected from among an epoxy resin, a vinyl ester resin, a phenol resin, and a urethane resin can be preferably used.

In addition, in any temperature range of 160 to 400° C., the melt viscosity of the thermoplastic resin is preferably 3,000 Pa·s or less, more preferably in a range of 90 to 2,900 Pa·s, and most preferably in a range of 100 to 2,800 Pa·s. When the melt viscosity in a temperature range of 160 to 400° C. exceeds 3,000 Pa·s, the fluidity during melting deteriorates and defects such as voids are likely to occur in the CFRP layer 120.

Among thermoplastic resins, a phenoxy resin is particularly preferably used because it has favorable moldability and has excellent adhesion to the carbon fibers 101a and the metal member 110, and can exhibit the same properties as a thermosetting resin having high heat resistance after molding when an acid anhydride, an isocyanate compound, caprolactam, or the like is used as a crosslinking agent.

Therefore, regarding the matrix resin 105 and a resin constituting the resin layer 120a in the CFRP layer 120, a solidified product of a phenoxy resin or a solidified product or cured product of a resin composition including 50 parts by weight or more of a phenoxy resin with respect to 100 parts by weight of resin components is preferable. When a resin composition including 50 parts by weight or more of a phenoxy resin with respect to 100 parts by weight of resin components is used, the metal member 110 and the CFRP layer 120 can be firmly bonded. More preferably, the composition of the raw material resin includes 55 parts by weight or more of a phenoxy resin with respect to 100 parts by weight of resin components.

The phenoxy resin is a thermoplastic resin obtained according to a condensation reaction between a dihydric phenol compound and an epihalohydrin, or a polyaddition reaction between a dihydric phenol compound and a bifunctional epoxy resin, and can be obtained by a conventionally known method in the presence of a solvent or in the absence of a solvent.

A phenoxy resin preferably used in the present invention is suitably a solid at room temperature and has a melt viscosity of 10,000 Pa·s or less at 200° C. The melt viscosity is preferably 1,000 Pa·s or less, and more preferably 500 Pa·s or less. When the melt viscosity exceeds 10,000 Pa·s, this is not preferable because the fluidity of the resin during molding is reduced and the resin may not be sufficiently spread and thus voids are caused. In addition, the average molecular weight of the phenoxy resin is generally 10,000 to 200,000, and is preferably 20,000 to 100,000, and more preferably 30,000 to 80,000 in terms of the mass average molecular weight (Mw). When Mw of the phenoxy resin is too low, the strength of the molded body is weak and when Mw of the phenoxy resin is too large, the workability and stepability tend to deteriorate. Here, Mw is a value that is measured through gel permeation chromatography and converted using a standard polystyrene calibration curve.

The hydroxyl equivalent (g/eq) of the phenoxy resin is generally 1,000 or less, and preferably 750 or less, and particularly preferably 500 or less. When the hydroxyl equivalent is too high, this is not preferable because there is a risk of the crosslinking density being insufficient and lowering the heat resistance.

The glass transition temperature (Tg) of the phenoxy resin is suitably in a range of 65° C. to 200° C., and preferably in range of 70° C. to 200° C., and more preferably in a range of 80° C. to 180° C. When Tg of the phenoxy resin is lower than 65° C., the moldability is improved, but Tg when the resin is formed into a crosslinked cured product is unlikely to be 180° C. or higher. When Tg of the phenoxy resin is higher than 200° C., the melt viscosity increases and the resin is unlikely to be impregnated into a reinforcing fiber substrate without defects such as voids. Here, Tg of the phenoxy resin is a numerical value that is measured using a differential scanning calorimeter (DSC) in heating conditions of 10° C./min, and in a range of 20 to 280° C., and calculated from a peak value of a second scan.

The phenoxy resin is not particularly limited as long as it has the above physical properties, and examples thereof include bisphenol A type phenoxy resins (for example, Phenotohto YP-50, Phenotohto YP-50S, Phenotohto YP-55U commercially available from Nippon Steel & Sumikin Chemical Co., Ltd.), bisphenol F type phenoxy resins (for example, Phenotohto FX-316 commercially available from Nippon Steel & Sumikin Chemical Co., Ltd.), copolymerized phenoxy resins of bisphenol A and bisphenol F (for example, YP-70 commercially available from Nippon Steel & Sumikin Chemical Co., Ltd.), and other special phenoxy resins such as brominated phenoxy resins, phosphorus-containing phenoxy resins, and sulfone group-containing phenoxy resins (for example, Phenotohto YPB-43C, Phenotohto FX293, YPS-007 commercially available from Nippon Steel & Sumikin Chemical Co., Ltd.). These can be used alone or two or more thereof can be used in combination.

In addition, the phenoxy resin can be used as a crosslinkable phenoxy resin composition (X) using a secondary hydroxyl group of a phenoxy resin side chain by adding an acid anhydride, an isocyanate, caprolactam, or the like as a crosslinking agent. In this case, the phenoxy resin composition (X) is a solid at room temperature, and suitably has a minimum melt viscosity at 100 to 350° C. of 3,000 Pa·s or less. Here, the minimum melt viscosity is preferably 2,900 Pa·s or less and more preferably 2,800 Pa·s or less. When the minimum melt viscosity at 100 to 350° C. exceeds 3,000 Pa·s, this is not preferable because the fluidity of the resin during molding is reduced and the resin may not be sufficiently spread and thus voids be caused.

The phenoxy resin composition (X) including the phenoxy resin (in this composition, referred to as a "phenoxy resin (A)"), and also an epoxy resin (B) and a crosslinking agent (C) containing an acid anhydride is preferable. According to coexistence of the epoxy resin (B), the melt viscosity is reduced and the moldability is improved, and also physical properties (strength, heat resistance) of a crosslinked cured product can be improved.

The phenoxy resin composition (X) preferably includes 50 parts by weight or more of the phenoxy resin (A) with respect to 100 parts by weight of resin components. In addition, in the phenoxy resin composition (X), an amount of the epoxy resin (B) added is preferably in a range of 10 to 85 parts by weight with respect to 100 parts by weight of the phenoxy resin (A). That is, a mixing ratio (A:B) of the epoxy resin (B) and the phenoxy resin (A) is preferably 100:10 to 100:85. When an amount of the epoxy resin (B) added exceeds 85 parts by weight, Tg of the crosslinked cured product is unlikely to be 180° C. or higher, and when an amount of the epoxy resin (B) is larger than that of the phenoxy resin (A), this is not preferable because a process time for curing the epoxy resin (B) is longer. In addition, when an amount of the epoxy resin (B) added is smaller than 10 parts by weight, a viscosity reduction effect according to addition of the epoxy resin (B) is not obtained, and it is difficult for the crosslinked cured product to exhibit a Tg of 180° C. or higher. An amount of the epoxy resin (B) added is more preferably in a range of 20 to 83 parts by weight and most preferably in a range of 30 to 80 parts by weight with respect to 100 parts by weight of the phenoxy resin (A).

Regarding the epoxy resin (B), any known in the related art can be used without particular limitation as long as it is a bifunctional or higher epoxy resin, and a solid epoxy resin having a softening point is suitable. Examples of the epoxy resin (B) include bisphenol type epoxy resins (for example, Epototo YD-011, YDF-2001, YSLV-80XY commercially available from Nippon Steel & Sumikin Chemical Co., Ltd.), biphenyl type epoxy resins (for example, YX-4000 commercially available from Mitsubishi Chemical Corporation), biphenylaralkyl type epoxy resins (for example, NC-3000 commercially available from Nippon Kayaku Co., Ltd.), diphenyl ether type epoxy resins (for example, YSLV-80DE commercially available from Nippon Steel & Sumikin Chemical Co., Ltd.), bisphenol sulfide type epoxy resins (for example, YSLV-120TE commercially available from Nippon Steel & Sumikin Chemical Co., Ltd.), hydroquinone type epoxy resins (for example, Epototo YDC-1312 commercially available from Nippon Steel & Sumikin Chemical Co., Ltd.), thioether type epoxy resins (for example, YSLV120TE commercially available from Nippon Steel Chemical & Material Co., Ltd.), phenolic novolak type epoxy resins (for example, Epototo YDPN-638 commercially available from Nippon Steel & Sumikin Chemical Co., Ltd.), ortho cresol novolak type epoxy resins (for example, Epototo YDCN-701 commercially available from Nippon Steel & Sumikin Chemical Co., Ltd.), aralkyl naphthalene diol novolak type epoxy resins (for example, ESN-355 commercially available from Nippon Steel & Sumikin Chemical Co., Ltd.), triphenylmethane type epoxy resins (for example, EPPN-502H commercially available from Nippon Kayaku Co., Ltd.), naphthalene type epoxy resins (for example, HP-4770, HP-5000 commercially available from DIC), and dicyclopentadiene type epoxy resins (for example, HP-7200 commercially available from DIC), but the epoxy resin (B) is not limited thereto, and two or more thereof may be used in combination.

Among the above solid epoxy resins, an epoxy resin exhibiting crystallinity is advantageous not only for increased filling of a filler because it can be handled as a powder but also since it exhibits high fluidity at a temperature equal to or higher than its melting point, and thus it is particularly preferable as the epoxy resin (B).

Here, a crystalline epoxy resin having a low chlorine content, a melting point in a range of 75° C. to 145° C., and a melt viscosity at 150° C. of 2.0 Pa·s or less is more preferable. When the melt viscosity exceeds 2.0 Pa·s, this is not preferable because the moldability of the phenoxy resin composition (X) deteriorates and homogeneity of the matrix resin 105 when used for the metal-CFRP composite body 100 deteriorates.

Examples of preferable crystalline epoxy resins include Epototo YSLV-80XY, YSLV-70XY, YSLV-120TE, and YDC-1312 (commercially available from Nippon Steel & Sumikin Chemical Co., Ltd.), YX-4000, YX-4000H, YX-8800, YL-6121H, and YL-6640 (commercially available from Mitsubishi Chemical Corporation), and HP-4032, HP-4032D, and HP-4700 (commercially available from DIC), and NC-3000 (commercially available from Nippon Kayaku Co., Ltd.).

The acid anhydride as the crosslinking agent (C) is not particularly limited as long as it is a solid at room temperature and does not exhibit much sublimation. In consideration of imparting heat resistance to the CFRP molded body and the reactivity, an aromatic acid anhydride having two or more acid anhydride groups that react with hydroxyl groups in the phenoxy resin (A) is preferable. In particular, an aromatic compound having two acid anhydride groups such as pyromellitic anhydride is preferably used because it has a higher crosslinking density than a hydroxyl group of trimellitic anhydride, and the heat resistance is improved. Among aromatic acid dianhydrides, for example, an aromatic acid dianhydride having compatibility with respect to the phenoxy resin and the epoxy resin such as 4,4'-oxydiphthalic acid, ethylene glycol bisanhydro trimellitate, and 4,4'-(4,4'-isopropylidene diphenoxy)diphthalic acid anhydride is more preferable because it has a stronger effect of improving Tg. In particular, for example, an aromatic acid dianhydride having two acid anhydride groups such as pyromellitic anhydride is preferably used because it has an improved crosslinking density and improved heat resistance compared with those of phthalic anhydride having only one acid anhydride group. That is, the aromatic acid dianhydride has favorable reactivity because it has two acid anhydride groups, whereby a crosslinked cured product with a strength sufficient for demolding is obtained in a short molding time, and it is possible to increase the final crosslinking density in order for four carboxyl groups to be generated due to an esterification reaction with secondary hydroxyl groups in the phenoxy resin (A).

The amount of the crosslinking agent (C) added is generally in a range of 0.9 to 1.4 mol of acid anhydride groups with respect to 1 mol of secondary hydroxyl groups in the phenoxy resin (A), and is preferably in a range of 1.0 to 1.3 mol thereof. When the amount of acid anhydride groups is too small, since an amount of reactive acid anhydride groups with respect to secondary hydroxyl groups in the phenoxy resin (A) is insufficient, the crosslinking density decreases and the rigidity of the cured product deteriorates, and when the amount thereof is too large, an amount of acid anhydride with respect to secondary hydroxyl groups in the phenoxy resin (A) is in excess, and unreacted acid anhydride adversely affects curing characteristics and the crosslinking density.

Regarding the reaction of the phenoxy resin (A), the epoxy resin (B), and the crosslinking agent (C), crosslinking and curing occurs due to an esterification reaction between secondary hydroxyl groups in the phenoxy resin (A) and acid anhydride groups in the crosslinking agent (C), and moreover, a reaction between a carboxyl group generated due to the esterification reaction and an epoxy group in the epoxy resin (B). A phenoxy resin crosslinked body can be obtained due to the reaction between the phenoxy resin (A) and the crosslinking agent (C). However, since the melt viscosity of the phenoxy resin composition (X) can be reduced due to coexistence of the epoxy resin (B), the moldability is improved, and a crosslinked cured product having excellent characteristics such as promotion of a crosslinking reaction, improvement in the crosslinking density, and improvement in the mechanical strength can be obtained. Here, it can be conceived that the phenoxy resin composition (X) also include the epoxy resin (B), but the phenoxy resin (A) which is a thermoplastic resin is a main component, and an esterification reaction between its secondary hydroxyl groups and an acid anhydride group in the crosslinking agent (C) is preferential. That is, since some time is taken for a reaction between an acid anhydride used as the crosslinking agent (C) and the epoxy resin (B), a reaction between the crosslinking agent (C) and secondary hydroxyl groups in the phenoxy resin (A) occurs first. Then, since a reaction between the crosslinking agent (C) remaining in the previous reaction, or remaining carboxyl groups derived from the crosslinking agent (C), and the epoxy resin (B) occurs, it is possible to further improve the crosslinking density. Therefore, unlike a resin composition containing an epoxy resin which is a thermosetting resin as a main component, a crosslinked cured product obtained using the crosslinkable phenoxy resin composition (X) retains its property of being a thermoplastic resin due to its crosslinked curing mechanism, and also has a better storage stability than an epoxy resin composition in which an acid anhydride is used as a curing agent.

(Coating Conditions in Powder Coating Method)

The average particle size of the fine powder 102 of a raw material resin used in the powder coating method is, for example, preferably in a range of 10 to 100 μm, more preferably in a range of 40 to 80 μm, and most preferably in a range of 40 to 50 μm. When the average particle size of the fine powder 102 exceeds 100 μm, in powder coating in an electrostatic field, the energy when the fine powder 102 collides with a fiber increases, and an adhesion rate for the reinforcing fiber substrate 101 decreases. In addition, when the average particle size is less than 10 μm, particles are scattered due to an associated air flow and the adhesion efficiency is lowered, and the fine powder 102 of a raw material resin suspended in the air may cause deterioration in a working environment. In order to make the raw material resin into a fine powder, a grinding and mixing machine such as a dry grinding machine at a low temperature (Century Dry Mill) is suitably used, but the present invention is not limited thereto. In addition, when the raw material resin is pulverized, a plurality of components as raw materials may be pulverized and then mixed or a plurality of components may be mixed in advance and then pulverized.

In powder coating, coating is performed so that an amount of the fine powder 102 of the raw material resin adhered to the reinforcing fiber substrate 101 (resin proportion: RC) is, for example, preferably in a range of 20 to 50%, more preferably in a range of 25 to 45%, and most preferably in a range of 25 to 40%. When RC exceeds 50%, mechanical properties such as a tensile and flexural modulus of CFRP deteriorate, and when RC is less than 20%, an amount of the raw material resin adhered is very small so that impregnation of the raw material resin into the reinforcing fiber substrate 101 is insufficient, and there is a risk of thermophysical properties and mechanical properties deteriorating.

(Conditions for Reinforcing Fiber Substrate)

Regarding the carbon fiber 101a constituting the reinforcing fiber substrate 101, for example, a non-woven fabric substrate using chopped fibers, a cloth material using continuous fibers, a unidirectional reinforcing fiber substrate (uni-directional (UD) material), and the like can be used, and in consideration of a reinforcement effect, it is preferable to use a cloth material or a UD material. In addition, regarding the type of the carbon fiber 101a, for example, any of a PAN type and a pitch type can be used, and these can be used alone or in combination according to the purpose or application.

When a cloth material or a UD material is used for the reinforcing fiber substrate 101 containing the carbon fiber 101a, preferably, a carbon fiber called a filament is subjected to an opening treatment.

In general, a carbon fiber is a fiber bundle including several thousands to several tens of thousands of a plurality of short fibers, and has a circular or slightly flat elliptical cross section. Therefore, it is difficult to reliably impregnate the resin into the fiber bundle. In the opening treatment, according to a known mechanical method, the carbon fiber bundle is widened and thinned in the width direction, and resin impregnation is improved compared to an unopened product, and thus physical properties of the molded particles are also improved.

Here, the weight per unit area of the reinforcing fiber substrate 101 is preferably in a range of 40 to 250 g/m$^2$. With a weight per unit area of less than 40 g/m$^2$, desired mechanical properties cannot be obtained because the number of reinforcing fibers in the molded article is small. In addition, when the weight per unit area exceeds 250 g/m$^2$, this is not preferable because it is difficult to impregnate a sufficient amount of resin into the reinforcing fiber substrate 101.

Step b:

In the step b, as shown in (b) and (c) of FIG. 1, the resin-adhered fiber substrate 103 is heated, the fine powder 102 of the raw material resin is incompletely melted and then solidified, and thereby the prepreg 104 having the partially fused structure 102A is formed using a resin including a thermoplastic resin. Here, "incomplete melting" does not mean melting so that all of the fine powder 102 of the raw material resin is made into droplets and flows, but means a state in which some of the fine powder 102 is completely made into droplets, but in most of the fine powder 102, only the surface is made into droplets and center parts remain in a solid state. In addition, in "the partially fused structure 102A," in the vicinity of the surface layer part of the reinforcing fiber substrate 101, the fine powder 102 is partially melted due to a heat treatment, and a molten material of the adjacent fine powder 102 is fused and solidified in a mesh-like linked state. According to the partially fused structure 102A, adhesion to the reinforcing fiber substrate 101 is improved and it is possible to prevent the fine powder 102 from falling off, and a certain air permeability in the thickness direction of the reinforcing fiber substrate 101 is secured. Therefore, in a heat and pressure treatment in the step B to be described, an air flow path in the reinforcing fiber substrate 101 is secured, and generation of voids can be avoided. Here, preferably, the partially fused structure 102A is uniformly formed on the entire surface of the prepreg 104 but may be unevenly distributed microscopically.

Here, while (c) of FIG. 1 shows a state in which the partially fused structure 102A is formed on one surface of the prepreg 104, the partially fused structure 102A may be formed on both surfaces of the prepreg 104.

(Heat Treatment Conditions)

In order to incompletely melt the fine powder 102 of the raw material resin so that the partially fused structure 102A can be formed, according to the melting point and the glass transition temperature (Tg) of the raw material resin to be used, the heat treatment heating temperature is preferably performed in a temperature range of about 100° C. to 400° C., and in the case of a crystalline resin, a temperature near the melting point (MP) is more preferable, and in the case of a non-crystalline resin, a temperature equal to or lower than Tg+150° C. is more preferable. When the heat treatment exceeds an upper limit, thermal melting of the fine powder 102 goes too far, the partially fused structure 102A is not formed, and air permeability may be impaired. In addition, when the temperature is lower than the lower limit of the heating temperature, the partially fused structure 102A is not formed, heat fusion to the reinforcing fiber substrate 101 is insufficient, and during a handling operation of the prepreg 104, there is a risk of the fine powder 102 dropping off and falling off.

In addition, the heat treatment time is not particularly limited as long as the raw material resin adhered to the reinforcing fiber substrate 101 can be fixed to the reinforcing fiber substrate 101, and is suitably 30 seconds or longer and shorter than 3 minutes, and preferably 30 seconds or longer and shorter than 2 minutes. That is, when the heat treatment is performed for a much shorter time than molding, the resin in the state of the partially fused structure 102A can be fixed to the reinforcing fiber substrate 101 and it is possible to prevent powder from falling off.

In the step of the prepreg 104 after the heat treatment, the raw material resin (the partially fused structure 102A and the fine powder 102 without change) is concentrated in the vicinity of the surface of the reinforcing fiber substrate 101 and does not enter the inside of the reinforcing fiber substrate 101 like a molded body after heating and pressurizing in the step B. Here, the heat treatment may be performed when the resin-adhered fiber substrate 103 is in contact with the metal member 110.

(Method 2)

The method 2 is a method in which the step a and the step b are performed together. That is, although not shown, the fine powder 102 of the raw material resin that is a solid at room temperature is adhered to at least one surface of the sheet-like reinforcing fiber substrate 101 heated to a predetermined temperature by a powder coating method, the fine powder 102 is incompletely melted and then solidified, and thus the prepreg 104 in which the partially fused structure 102A is formed is formed. In the method 1, the powder-coated fine powder 102 is fixed to the reinforcing fiber substrate 101 according to the heat treatment. However, in the method 2, powder coating of the fine powder 102 is performed on the reinforcing fiber substrate 101 heated in advance, and thus fusion is performed simultaneously with application to the reinforcing fiber substrate 101 to form the partially fused structure 102A.

The conditions in the method 2 are omitted because they are the same as in the method 1.

(Thickness of Prepreg)

The thickness of the prepreg 104 obtained in the step A is preferably in a range of 40 to 200 μm, and more preferably in a range of 50 to 150 μm. When the thickness of the prepreg 104 is less than 40 μm, impregnation failure may occur due to deterioration of handling properties and an insufficient resin. When the thickness of the prepreg 104 exceeds 200 μm, impregnation of the melted resin into the reinforcing fiber substrate 101 in the step B is insufficient, which may lead a decrease in the mechanical strength.

(Air Permeability of Prepreg)

When the thickness of the prepreg 104 is 40 to 200 μm, the air permeability in the thickness direction is preferably in a range of 500 to 1,000 cc/cm$^2$/sec, and more preferably in a range of 700 to 900 cc/cm$^2$/sec. When the air permeability is less than 500 cc/cm$^2$/sec, in the heat and pressure treatment in the step B to be described below, an air flow path in the prepreg 104 decreases and voids are easily generated. That is, in bonding with the dense metal member 110, since it is important for air present in the prepreg 104 to escape to the side opposite to the bonding surface in the thickness direction, degassing from the prepreg 104 can be easily performed by controlling the air permeability such that it becomes 500 cc/cm$^2$/sec or higher. On the other hand, when the air permeability exceeds 1,000 cc/cm$^2$/sec, the fine powder 102 of the raw material resin easily falls off, and handling properties may deteriorate.

Regarding irregularities of the surface of the prepreg 104, the surface roughness is preferably an arithmetic average roughness (Ra) of 0.010 to 0.100 mm, and more preferably 0.015 to 0.075 mm. When Ra is within the above range, in the heat and pressure treatment in the step B to be described below, air in the prepreg 104 can also escape from the side. Therefore, also in bonding in which the prepreg 104 is interposed between the dense metal members 110, the prepreg 104 and the metal member 110 are firmly bonded, and a metal-CFRP composite body 100 having an excellent mechanical strength is obtained.

Here, when Ra is less than 0.010 mm, since the prepreg 104 is easily fused together in the heat and pressure treatment, there are no air flow paths, which cause generation of voids. On the other hand, when Ra exceeds 0.100 mm, this is not suitable because voids remain.

(Resin Concentration Gradient in Prepreg)

In the prepreg 104, based on the end surface of the reinforcing fiber substrate 101 in which the partially fused structure 102A is formed using the raw material resin, preferably 10 weight % or more and more preferably 10 to 40 weight % of the raw material resin is adhered in a range of 0 to 50% in a thickness direction with respect to the thickness of the reinforcing fiber substrate 101. In this manner, if a gradient is provided in an adhesion concentration of the raw material resin, when a surface of the prepreg 104 on which the partially fused structure 102A is formed is brought into contact with the metal member 110 and heated and pressurized in the following step B, the sufficient melted resin can spread on the boundary between the prepreg 104 and the metal member 110. That is, when a high concentration solid raw material resin containing the partially fused structure 102A is brought into contact with the surface using properties of the metal member 110 such as high thermal conductivity and being easily heated, melting of the resin can be promoted and a large amount of the melted resin can be supplied to the bonding boundary. Therefore, a raw material resin having a relatively high melt viscosity can be made to penetrate the entire prepreg 104 in a short time and the resin layer 120a to be described can be formed. Here, even if a resin concentration on the bonding surface side on which the partially fused structure 102A is formed is made higher, when the air permeability is controlled so that it is within the above range, in the step B, air present in the prepreg 104 can escape to the side opposite to the bonding surface of the prepreg 104 in the thickness direction, and thus generation of voids can be avoided.

<Step B>

In the step B, as shown in (a) and (b) of FIG. 2, the heat and pressure treatment is performed when a surface on which the partially fused structure 102A of the prepreg 104 obtained in the step A is formed is brought into contact with the surface of the metal member 110. According to the heat and pressure treatment, the raw material resin adhered to the prepreg 104 is completely melted and wet and spreads on the surface of the metal member 110, and at the same time, the raw material resin is impregnated into the reinforcing fiber substrate 101. The raw material resin impregnated in this manner is solidified or cured in a melted state to form the matrix resin 105, and the CFRP layer 120 as a fiber-reinforced resin material is formed, and the CFRP layer 120 adheres to the metal member 110. In addition, in the step B, as shown in FIG. 3, when the fine powder 102 of the raw material resin adhered to the surface side on which the partially fused structure 102A of the prepreg 104 is formed is brought into contact with the metal member 110 in the heat and pressure treatment and wet and spreads in a thin film form, the resin layer 120a in which there are almost no carbon fibers 101a and which is made of substantially only a resin including a thermoplastic resin is preferably formed. The structure of the resin layer 120a will be described below. Accordingly, it is possible to form the metal-CFRP composite body 100 in which the CFRP layer 120 and the metal member 110 are firmly bonded.

(Metal Member)

The material of the metal member 110 used for the metal-CFRP composite body 100 is not particularly limited as long as it can be molded by pressing and the like, and examples thereof include iron, titanium, aluminum, magnesium, and alloys thereof. Here, the alloy refers to, for example, an iron alloy (including stainless steel), a Ti alloy, an Al alloy, a Mg alloy, or the like. Preferable examples of the metal member 110 include carbon steel, alloy steel, high-tensile steel and the like used for general structures and mechanical structures which are steel materials defined in the Japanese Industrial Standards (JIS) and the like. Specific examples of such a steel material include cold rolled steel, hot rolled steel, a hot rolled steel plate material for an automobile structure, and a hot rolled steel high tensile steel plate material for automobile processing. The shape and thickness of the metal member 110 are not particularly limited as long as it can be molded by pressing and the like, and for example, a plate shape is preferable.

When the metal member 110 is a steel material, any surface treatment may be performed on the surface. Here, examples of surface treatments include various plating treatments such as zinc plating and aluminum plating, chemical conversion treatments such as a chromate treatment and a non-chromate treatment, and chemical surface roughening treatments using physical or chemical etching such as sand blasting, but the present invention is not particularly limited thereto. In addition, a plurality of types of surface treatments may be performed. Regarding the surface treatment, at least a rust prevention treatment is preferably performed.

In addition, in order to improve adhesion between the metal member 110 and the CFRP layer 120, it is preferable to treat the surface of the metal member 110 with a primer. Preferable examples of primers include a silane coupling agent and triazine thiol derivatives. Examples of silane coupling agents include an epoxy-based silane coupling agent, an amino-based silane coupling agent, and an imidazole silane compound. Examples of triazine thiol derivatives include 6-diallylamino-2,4-dithiol-1,3,5-triazine, 6-methoxy-2,4-dithiol-1,3,5-triazine monosodium, 6-propyl-2,4-dithiolamino-1,3,5-triazine monosodium and 2,4,6-trithiol-1,3,5-triazine.

(Heat and Pressure Treatment Conditions)

In the heat and pressure treatment, the raw material resin is completely melted due to heat and becomes a liquid, and penetrates into the prepreg 104 due to pressurizing. However, since an air flow path is secured in the prepreg 104 having an air permeability that is controlled so that it has a predetermined level, the melted resin penetrates while expelling air, impregnation is completed in a short time even at a relatively low pressure, and generation of voids can be avoided.

In order to completely melt the fine powder 102 of the raw material resin and impregnate it into the entire reinforcing fiber substrate 101, according to the melting point and the glass transition temperature of the thermoplastic resin to be used, the heat and pressure treatment is preferably performed in a temperature range of about 100° C. to 400° C. In the temperature range, in the case of a crystalline resin, a temperature equal to or higher than the melting point (MP)+30° C. is more preferable, and in the case of a non-crystalline resin, a temperature equal to or higher than the glass transition temperature (Tg)+100° C. is more preferable. When the temperature exceeds the upper limit, since excess heat is applied, decomposition of the resin may be caused, and when the temperature is lower than the lower limit, since the melt viscosity of the resin increases, impregnation into the reinforcing fiber substrate 101 deteriorates.

In the heat and pressure treatment, the pressure at which the metal member 110 and the prepreg 104 are subjected to compression bonding is, for example, preferably 3 MPa or more and more preferably in a range of 3 to 5 MPa. When the pressure exceeds the upper limit, since an excess pressure is applied, deformation or damage may be caused, and when the pressure is lower than the lower limit, impregnation into the reinforcing fiber substrate 101 deteriorates.

Regarding the heat and pressure treatment time, since the impregnation time can be made shorter than that of the film stacking method by controlling the partially fused structure 102A, the concentration gradient of the resin and the air permeability, for example, thermocompression bonding is possible within at least 3 minutes or longer, and a range of 3 to 10 minutes is preferable.

In the step B, simultaneously with the heat and pressure treatment, the metal member 110 and the prepreg 104 may be molded into an arbitrary three-dimensional shape. In this case, the pressure at which the metal member 110 and the prepreg 104 are subjected to compression bonding and molded is preferably based on a pressure necessary for pressing and molding the metal member 110.

In addition, in the present embodiment, it is preferable to produce a composite body having a three-dimensional shape by batch molding the metal member 110 and the prepreg 104. However, in the step B, the prepreg 104 is suitably compressed and bonded to the metal member 110 molded into an arbitrary three-dimensional shape in advance, which is also suitable.

Combinatory batch molding of the metal member 110 and the CFRP layer 120 using a press molding device is preferably performed by hot pressing. However, it is possible to perform processing by quickly setting a material heated to a predetermined temperature in advance in the press molding device at a low temperature.

Here, when a member is set in the press molding device, the metal member 110 and the prepreg 104 may be temporarily fixed in advance. Temporary fixing conditions are not particularly limited as long as the partially fused structure 102A of the prepreg 104 is maintained and the air permeability is secured.

As shown in (b) of FIG. 2, the obtained metal-CFRP composite body 100 includes the metal member 110 and the CFRP layer 120 as a fiber-reinforced resin material. The CFRP layer 120 includes the matrix resin 105 and the carbon fiber 101a which is a composite reinforcing fiber contained in the matrix resin 105.

In addition, as shown in FIG. 3, in the CFRP layer 120, the resin layer 120a which having a thickness of 20 µm or less and a fiber content of 5 weight % or less and which preferably contains no fiber and is formed using a resin including a thermoplastic resin may be formed between the surface of the metal member 110 and the carbon fiber 101a closest to the surface as a part thereof. The resin layer 120a is a resin layer in which the fine powder 102 of the raw material resin adhered to the surface side on which the partially fused structure 102A of the prepreg 104 is formed is brought into contact with the metal member 110 in the heat and pressure treatment, and wet and spreads in a thin film form, and there is almost no carbon fiber 101a formed by solidification thereof, and which is made of substantially only a resin including a thermoplastic resin. That is, although there is still a possibility of fluff fibers from the carbon fiber 101a penetrating, the resin layer 120a does not contain fibers in order to reinforce the resin. Therefore, the resin layer 120a is a resin layer in which no reinforcing action of fibers is exhibited, and the mechanical strength such as bending strength and flexural modulus of the resin layer 120a is the same as the mechanical strength of the resin itself including the solidified thermoplastic resin. Since such a resin layer 120a is uniformly formed with a substantially uniform thickness on the bonding surface between the metal member 110 and the CFRP layer 120 and there are no voids, adhesion between the metal member 110 and the CFRP layer 120 becomes stronger. On the other hand, since the resin layer 120a is a thin layer formed of only a resin (the matrix resin 105) including a non-fiber-reinforced thermoplastic resin, the mechanical strength thereof is inferior to that of a part of the reinforcing fiber substrate 101 in the matrix resin 105. Therefore, when the thickness of the resin layer 120a is too large, the mechanical strength and durability of the metal-CFRP composite body 100 are impaired. In this regard, the thickness of the resin layer 120a is, for example, preferably 15 µm or less, and more preferably in a range of 1 to 10 µm, and most preferably in a range of 5 to 10 µm. The thickness of the resin layer 120a can be measured by, for example, cutting the metal-CFRP composite body 100 using a diamond cutter or the like, and observing a cross section polished and smoothened using a cross section polisher (CP) or the like under a scanning electron microscope (SEM).

The metal-CFRP composite body 100 need only include the metal member 110 and at least one CFRP layer 120 as a layer in contact with the metal member 110, and may include one or more arbitrary CFRP layers (not shown) laminated on the CFRP layer 120 in addition to the CFRP layer 120. The thickness and the number of arbitrary CFRP layers can be appropriately set according to the purpose of use. When a plurality of arbitrary CFRP layers are provided, the CFRP layers may have the same configuration or different configurations.

[Three-Dimensional Integral Molding Processing]

Next, an aspect of a production method in which the metal member 110 and the prepreg 104 are molded into an arbitrary three-dimensional shape simultaneously with the heat and pressure treatment will be described with reference to FIG. 4. Here, a metal-CFRP composite body 100A processed into a three-dimensional shape exemplified in (d) of FIG. 4 is produced.

Figure 4:
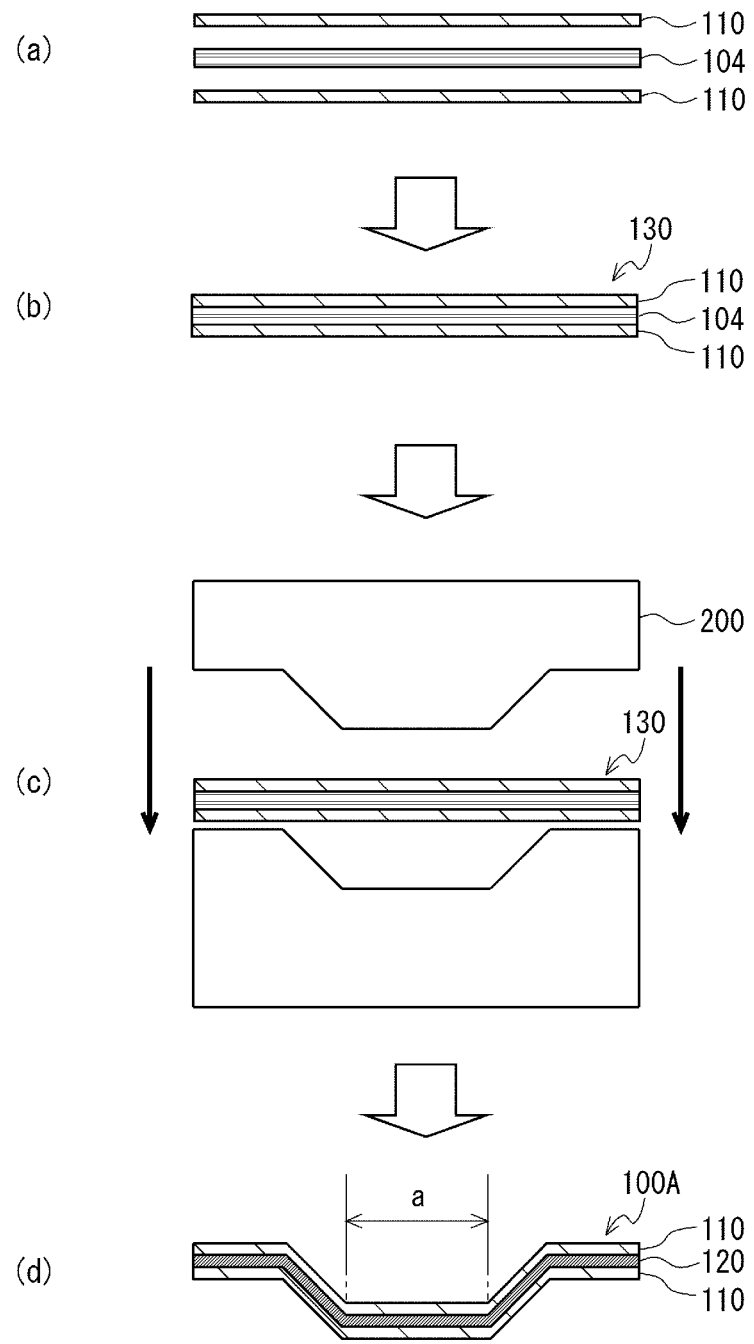
FIG. 4 shows schematic diagrams of producing steps of producing a metal-CFRP composite body according to three-dimensional integral molding preprocess.

First, as shown in (a) of FIG. 4, the flat prepreg 104 and two flat metal members 110 are prepared. Then, the metal members 110 are disposed on both sides of the prepreg 104. Here, the prepreg 104 may be a single layer or a laminate in which a plurality of prepregs are laminated.

Next, as shown in (b) of FIG. 4, the prepreg 104 is interposed between two metal members 110 in a sandwich manner and temporary bonding is performed to form a laminate 130. In the temporary bonding, the prepreg 104 and the metal member 110 are bonded and temporarily fixed. Since the partially fused structure 102A is formed on the surface of the prepreg 104, and the amount of resin is large, when bonding is performed while heat is applied to an extent that the resin component melts, and cooling is performed, it is possible to produce the laminate 130 having appropriate adhesion between the prepreg 104 and the metal member 110. The laminate 130 is an intermediate (semi-finished product) of the metal-CFRP composite body 100A processed into a three-dimensional shape, and in the next step, shaping is performed and the resin component is completely impregnated to form a product. In temporary bonding conditions, heating is performed, for example, at 160° C. or lower, and preferably at a temperature of about 120 to 150° C. In addition, pressurizing may be performed simultaneously with heating. In this case, the laminate 130 may be in a state in which the reinforcing fiber substrate is almost impregnated according to the raw material resin or the uncrosslinked resin composition or is preferably in a state in which the partially fused structure 102A of the prepreg 104 is maintained and air permeability is secured.

Next, as shown in (c) of FIG. 4, the laminate 130 is set in a mold 200 in which processing into a predetermined shape is possible and a heat and pressure molding treatment is performed. According to the heat and pressure molding treatment, the raw material resin melts and penetrates to the inside of the reinforcing fiber substrate 101 to form the matrix resin 105, and the resin layer 120a is formed at the interface with the metal member 110. In the heat and pressure molding treatment, in order to completely melt the fine powder 102 of the raw material resin and impregnate it into the entire reinforcing fiber substrate 101, according to the melting point and the glass transition temperature of the thermoplastic resin to be used, the treatment is preferably performed in a temperature range of about 100° C. to 400° C. In addition, in the heat and pressure molding treatment, the pressure at which the metal member 110 and the prepreg 104a are subjected to compression bonding is, for example, 3 MPa or more, and may be a pressure at which the metal member 110 can be molded.

As described above, for example, it is possible to produce the metal-CFRP composite body 100A integrally formed into a three-dimensional shape as shown in (d) of FIG. 4.

Regarding a preferable aspect of the above three-dimensional integral molding processing, a crosslinkable phenoxy resin composition (X) can be used as a raw material resin for the matrix resin 105. In temporary bonding temperature conditions, in the crosslinkable phenoxy resin composition (X), crosslinking hardly occurs and the resin simply melts. Therefore, in the stage of the laminate 130, it is possible to maintain a state in which the metal member 110 and the prepreg 104 are fixed while the potential crosslinking reactivity is maintained. When such a laminate 130 is used as an intermediate (semi-finished product), it can be stored in a smaller space than a shaped product, and since the shaping ability and reactivity are maintained, it is possible to realize a flexible production system that processes a semi-finished product according to the demand.

Then, when the crosslinkable phenoxy resin composition (X) is used, in the heat and pressure molding treatment, since the uncrosslinked resin changes to a crosslinked cured product, Tg of the matrix resin 105 and the resin layer 120a after crosslinking and curing is greatly improved compared to when the phenoxy resin (A) is used alone, and the heat resistance is improved.

That is, before and after the heat and pressure molding treatment is performed on the intermediate (semi-finished product) shown in FIG. 4, Tg varies because an uncrosslinked solidified product in which the resin is solidified but it is not crosslinked is changed to a crosslinked cured product. Specifically, Tg of the resin before the crosslinking in the intermediate (semi-finished product) is, for example, 150° C. or lower. On the other hand, Tg of the resin crosslinked after the heat and pressure molding treatment increases to, for example, 160° C. or higher, and preferably in a range of 170 to 220° C. Therefore, excellent heat resistance can be imparted to the metal-CFRP composite body 100A.

When the crosslinkable phenoxy resin composition (X) is used as a raw material resin, since the uncrosslinked resin changes to a crosslinked cured product in the heat and pressure molding treatment, the heat and pressure molding treatment is preferably performed, for example, in a temperature range of 180 to 240° C. for a time of about 10 to 30 minutes. In addition, the pressure at which the metal member 110 and the CFRP layer 120 are subjected to compression bonding in the heat and pressure molding treatment may be for example, 3 MPa or more, and may be a pressure at which the metal member 110 can be molded.

<Post-Step>

Preferably, the metal-CFRP composite bodies 100 and 100A after integral molding are subjected to any treatment, for example, post curing, according to the type of the raw material resin. Post curing is preferably performed, for example, at 200 to 250° C. for about 30 to 60 minutes. Here, a thermal history in the post-step such as coating can be used in place of post curing.

In addition, regarding the post-step for the metal-CFRP composite bodies 100 and 100A, in addition to coating, a drilling step for mechanical adhering to other members using bolts or rivets, application of an adhesive for bonding and adhering, assembling or the like is performed.

EXAMPLES

While the present invention will be described below in further detail with reference to examples, the present invention is not limited to those described in such examples. Here, tests of various physical properties and measurement methods in examples are as follows.

[Mechanical Strength]

Figure 5:
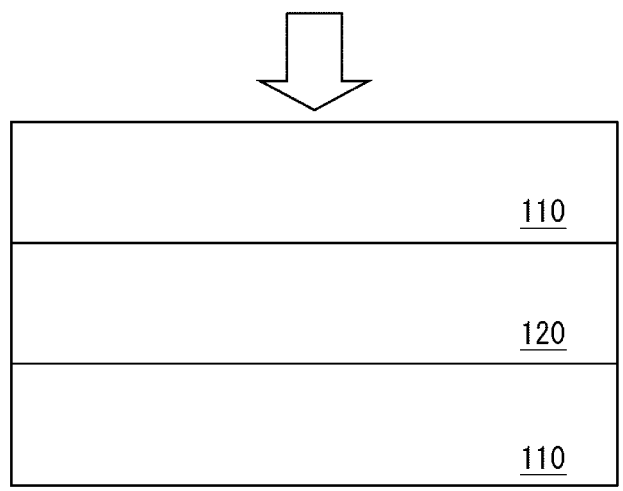
FIG. 5 is an illustrative diagram showing a configuration of a sample of a metal-CFRP composite body for a bending test in examples and comparative examples.

According to the JIS K 7074:1988 fiber-reinforced plastic bending test method, mechanical strengths (bending strength, flexural modulus) of the metal-CFRP composite bodies obtained as examples were measured. As shown in FIG. 5, a CFRP layer 120 formed to have a total thickness of 0.2 mm or 0.4 mm was disposed between two metal members 110, and thermocompression bonding was performed under conditions shown in respective examples and comparative examples, and thereby samples of a metal-CFRP composite body for a bending test were obtained. The white arrow in FIG. 5 indicates a load application direction.

In addition, when the mechanical strength was measured, it was evaluated as x (poor) when the metal member 110 was peeled off from the CFRP layer 120 when the sample was broken, and it was evaluated as ○ (good) when there was no peeling off.

[Shear Test]

Measurement was performed with reference to the tensile shear bonding strength test method for the adhesive according to JIS K 6850:1999.

Figure 6:
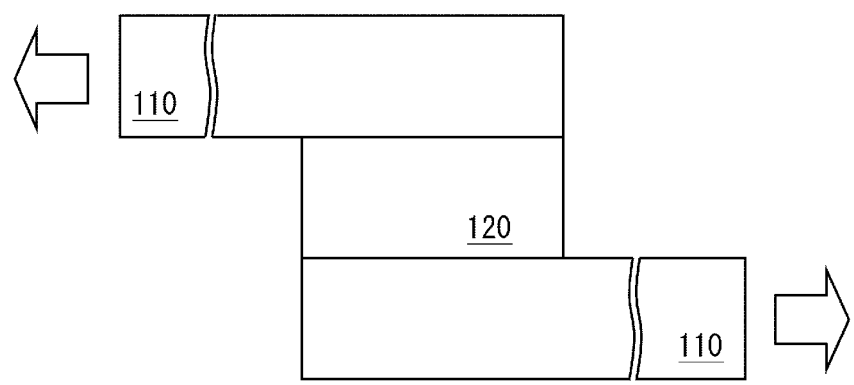
FIG. 6 is an illustrative diagram showing a configuration of a sample of a metal-CFRP composite body for a shear test in examples and comparative examples.

As shown in FIG. 6, two metal members 110 were prepared, respective parts of 10 mm from ends of the metal member 110 were bonded to a CFRP layer 120 formed to have a total thickness of 0.2 mm or 0.4 mm, and thereby samples of a metal-CFRP composite body for a shear test were produced. That is, the samples of a metal-CFRP composite body for a shear test were produced by inserting a CFRP layer 120 between vicinities of ends of two upper and lower metal members 110 and performing thermocompression bonding under conditions shown in examples and comparative examples. Two white arrows in FIG. 6 indicate a tensile load application direction.

[Voids]

The metal-CFRP composite body was cut using a diamond cutter, and the obtained cross section was polished with abrasive paper and diamond abrasive grains, and then observed under an optical microscope. It was evaluated as ○ (good) when no voids were confirmed and it was evaluated as x (poor) when voids were confirmed.

[Glass Transition Temperature (Tg)]

Measurement was performed using a dynamic viscoelasticity measuring device (DMA 7e commercially available from Perkin Elmer) under heating conditions of 5° C./min and in a range of 25 to 250° C., and the maximum peak of the obtained tan δ was set as Tg.

[Average Particle Size (D50)]

Regarding the average particle size, a particle size at which a cumulative volume was 50% based on the volume was measured using a laser diffraction and scattering type particle size distribution measuring device (Micro Trak MT3300EX, commercially available from Nikkiso Co., Ltd.).

[Melt Viscosity]

A sample with a size of 4.3 cm$^3$ was interposed between parallel plates using a rheometer (commercially available from Anton Paar), while raising the temperature at 20° C./min, the melt viscosity at 250° C. was measured under conditions of a frequency of 1 Hz and a load strain of 5%. However, in a crosslinkable resin composition, a minimum value of the viscosity at 160° C. to 250° C. was set as a melt viscosity.

[Resin Proportion (RC: %)]

A resin proportion was calculated from a weight (W1) of a reinforcing fiber substrate before the matrix resin was adhered and a weight (W2) of a CFRP molding material after the resin was adhered using the following formula.

$$\text{Resin proportion } (RC: \%) = (W2 - W1)/W2 \times 100$$

W1: weight of the reinforcing fiber substrate before the resin is adhered

W2: weight of the CFRP molding material after the resin is adhered

[Air Permeability]

Using a Frazier type air permeability tester (air permeability tester KES-F8 commercially available from Kato Tech Co., Ltd.) according to the JIS L1096:2010 A method, the air permeability of the prepreg for molding a fiber-reinforced plastic produced in the examples was measured.

[Surface Roughness]

Using a 3D surface shape analysis system NAZCA-3D (commercially available from Mitani Corporation), the arithmetic average roughness (Ra) of the prepreg for molding a fiber-reinforced plastic produced in the examples was measured.

[Measurement of Thickness of Resin Layer]

The metal-CFRP composite body was cut using a diamond cutter, and the obtained cross section was polished with abrasive paper and diamond abrasive grains and then polished using a cross section polisher (CP) treatment, and observed under a scanning electron microscope (SEM), and thereby the thickness was measured.

[FRP Prepreg]

Polyamide resin CFRP prepreg (commercial prepreg) BHH-100GWODPT1/PA commercially available from Sakai Ovex Co., Ltd., Vf (fiber volume content): 47%

[Phenoxy Resin (A)]

(A-1): Phenotohto YP-50S (commercially available from Nippon Steel & Sumikin Chemical Co., Ltd., bisphenol A type, Mw=40,000, hydroxyl equivalent=284 g/eq, melt viscosity at 250° C.=90 Pa·s, Tg=83° C.

[Epoxy Resin (B)]

YSLV-80XY (commercially available from Nippon Steel & Sumikin Chemical Co., Ltd., tetramethyl bisphenol F type, epoxy equivalent=192 g/eq, melting point=72° C.)

[Crosslinking Agent (C)]

Ethylene glycol bisanhydro trimellitate: TMEG (acid anhydride equivalent: 207, melting point: 160° C.)

[Polyamide Resin (R-1)]

CM1017 (commercially available from Toray Industries, Inc., melting point=225° C., melt viscosity at 250° C.=125 Pa·s, Tg=55° C.)

Preparation Example 1

[Production of Phenoxy Resin CFRP Prepreg A]

A powder obtained by pulverizing and classifying A-1 and having an average particle size D50 of 80 µm was used as the phenoxy resin (A), carbon fibers (UD material: Pyrofil TR50S 15L commercially available from Mitsubishi Rayon Co., Ltd.) that were opened and aligned in one direction were used as a substrate, and in an electrostatic field, powder coating was performed under conditions of a charge of 70 kV and a spray air pressure of 0.32 MPa. Then, heating and melting were performed in an oven at 170° C. for 1 minute, the resin was thermally fused to form a partially fused structure, and thereby a unidirectional fiber-reinforced phenoxy resin CFRP prepreg A having a thickness of 0.13 mm, an air permeability of 814 cc/cm$^2$/sec, a surface roughness (Ra) of 0.040 mm, and a resin proportion (RC) of 48% was produced.

Preparation Example 2

[Production of Phenoxy Resin CFRP Prepreg B]

A powder obtained by pulverizing and classifying A-1 and having an average particle size D50 of 80 µm was used as the phenoxy resin (A), and an open fiber product (SA-3203 commercially available from Sakai Ovex Co., Ltd.) of a plain fabric reinforcing fiber substrate (cloth material: IMS60 commercially available from Toho Tenax Co., Ltd.) made of carbon fibers was used as a substrate, and in an electrostatic field, powder coating was performed under conditions of a charge of 70 kV and a spray air pressure of 0.32 MPa. Then, heating and melting were performed in an oven at 170° C. for 1 minute, the resin was thermally fused to form a partially fused structure, and thereby a unidirectional fiber-reinforced phenoxy resin CFRP prepreg B having a thickness of 0.24 mm, an air permeability of 527 cc/cm$^2$/sec, a surface roughness (Ra) of 0.052 mm, and a resin proportion (RC) of 48% was produced.

Preparation Example 3

[Production of Phenoxy Resin CFRP Prepreg C]

A powder obtained by pulverizing and classifying A-1 and having an average particle size D50 of 80 µm was used as the phenoxy resin (A), carbon fibers (UD material: Pyrofil TR50S 15L commercially available from Mitsubishi Rayon Co., Ltd.) that were opened and aligned in one direction were used as a substrate, and powder coating was performed using a fluid bed method. Then, heating and melting were performed in an oven at 170° C. for 1 minute, the resin was thermally fused to form a partially fused structure, and thereby a unidirectional fiber-reinforced phenoxy resin CFRP prepreg C having a thickness of 0.15 mm, an air permeability of 712 cc/cm$^2$/sec, a surface roughness (Ra) of 0.052 mm, and a resin proportion (RC) of 48% was produced.

Preparation Example 4

[Production of Polyamide Resin CFRP Prepreg D]

A powder obtained by pulverizing and classifying a polyamide resin R-1 and having an average particle size D50 of 80 µm was used, carbon fibers (UD material: Pyrofil TR50S 15L commercially available from Mitsubishi Rayon Co., Ltd.) that were opened and aligned in one direction were used as a substrate, and in an electrostatic field, powder coating was performed under conditions of a charge of 70 kV and a spray air pressure of 0.32 MPa. Then, heating and melting were performed in an oven at 170° C. for 1 minute, the resin was thermally fused to form a partially fused structure, and thereby a unidirectional fiber-reinforced polyamide resin CFRP prepreg D having a thickness of 0.15 mm, an air permeability of 788 cc/cm$^2$/sec, a surface roughness (Ra) of 0.038 mm, and a resin proportion (RC) of 44% was produced.

Preparation Example 5

[Production of Crosslinked Phenoxy Resin CFRP Prepreg E]

100 parts by weight of A-1 as the phenoxy resin (A), 30 parts by weight of the epoxy resin (B), and 73 parts by weight of the crosslinking agent (C) were prepared and they were pulverized and classified to obtain a powder having an average particle size D50 of 80 μm and dried and blended using a dry powder mixer (rocking mixer commercially available from Aichi Electric Co., Ltd.). In the obtained crosslinkable phenoxy resin composition, an open fiber product (SA-3203 commercially available from Sakai Ovex Co., Ltd.) of a plain fabric reinforcing fiber substrate (cloth material: IMS60 commercially available from Toho Tenax Co., Ltd.) made of carbon fibers was used as a reinforcing fiber substrate, and in an electrostatic field, powder coating was performed under conditions of a charge of 70 kV and a spray air pressure of 0.32 MPa. Then, heating and melting were performed in an oven at 170° C. for 1 minute, the resin was thermally fused to form a partially fused structure, and thereby a crosslinked phenoxy resin CFRP prepreg E having a thickness of 0.16 mm, an air permeability of 800 cc/cm$^2$/sec, a surface roughness (Ra) of 0.048 mm, and a resin proportion (RC) of 48% was produced.

Here, the melt viscosity at 250° C. of the crosslinkable phenoxy resin composition was 250 Pa·s. In addition, in order to obtain Tg of the phenoxy resin after crosslinking and curing, a plurality of produced prepregs were laminated and pressurized in a press machine heated to 200° C. at 3 MPa for 3 minutes to produce a CFRP laminate having a thickness of 2 mm, the laminate was post-cured at 170° C. for 30 minutes, and then cut into a test piece with a width of 10 mm and a length of 10 mm using a diamond cutter, and measurement was performed using a dynamic viscoelasticity measuring device (DMA 7e commercially available from Perkin Elmer) under heating conditions of 5° C./min in a range of 25 to 250° C., and the maximum peak of the obtained tan δ was set as Tg.

Preparation Example 6

[Production of Phenoxy Resin CFRP Prepreg F]

A-1 was used as the phenoxy resin (A), a phenoxy resin was melted in an extruder heated to 200 to 230° C., and a phenoxy resin sheet having a thickness of 0.02 mm was produced by an inflation method. Next, carbon fibers (UD material: Pyrofil TR50S 15L commercially available from Mitsubishi Rayon Co., Ltd.) that were opened and aligned in one direction were laminated on the phenoxy resin sheet, the phenoxy resin was melted and impregnated into the reinforcing fiber substrate at 240° C. and 5 MPa using a heat press machine, and thereby a unidirectional fiber-reinforced phenoxy resin prepreg F having a thickness of 0.08 mm, an air permeability of 0 cc/cm$^2$/sec, a surface roughness (Ra) of 0.014 mm, and a resin proportion (RC) of 44% was produced.

[Metal Member]

Metal member (M-1): EG

Electro-galvanized steel plate NSECC commercially available from Nippon Steel Corporation, thickness of 0.4 mm, without chemical conversion treatment Metal member (M-2): TFS Tin free steel plate commercially available from Nippon Steel Corporation, thickness of 0.2 mm Metal member (M-3): aluminum BACS thick plate series, aluminum (A1050P), commercially available from Hikari Co., Ltd., thickness of 1 mm Example 1

M-1 was used as the metal member 110, a plurality of phenoxy resin CFRP prepregs A of Preparation Example 1 were used, and a sample of a metal-CFRP composite body for a bending test having a structure shown in FIG. 5 and the CFRP layer 120 with a thickness of 0.2 mm, and a sample of a metal-CFRP composite body for a shear test having a structure shown in FIG. 6 and the CFRP layer 120 with a thickness of 0.2 mm were pressed in a press machine heated to 200° C. at 3 MPa for 3 minutes for production. The thickness of the resin layer 120a at the metal CFRP interface was 8 μm. The obtained two samples were cooled and then subjected to the bending test and the shear test.

Example 2

M-1 was used as the metal member 110, a plurality of phenoxy resin CFRP prepregs A of Preparation Example 1 were used, and a sample of a metal-CFRP composite body for a bending test having a structure shown in FIG. 5 and the CFRP layer 120 with a thickness of 0.4 mm, and a sample of a metal-CFRP composite body for a shear test having a structure shown in FIG. 6 and the CFRP layer 120 with a thickness of 0.4 mm were pressed in a press machine heated to 200° C. at 3 MPa for 3 minutes for production. The thickness of the resin layer 120a at the metal CFR P interface was 8 μm. The obtained two samples were cooled and then subjected to the bending test and the shear test.

Example 3

Two metal-CFRP composite body samples were produced in the same manner as in Example 1 except that a plurality of phenoxy resin CFRP prepregs B of Preparation Example 2 were used, and the thickness of the CFRP layer 120 was 0.4 mm. The thickness of the resin layer 120a at the metal CFRP interface was 7 μm. The obtained two samples were cooled and then subjected to the bending test and the shear test.

Example 4

Two metal-CFRP composite body samples were produced in the same manner as in Example 1 except that M-2 was used as the metal member 110 and the thickness of the CFRP layer 120 was 0.4 mm. The thickness of the resin layer 120a at the metal CFRP interface was 7 μm. The obtained two samples were cooled and then subjected to the bending test and the shear test.

Example 5

Two metal-CFRP composite body samples were produced in the same manner as in Example 1 except that M-3 was used as the metal member 110 and the thickness of the CFRP layer 120 was 0.4 mm. The thickness of the resin layer 120a at the metal CFRP interface was 8 µm. The obtained two samples were cooled and then subjected to the bending test and the shear test.

Example 6

Two metal-CFRP composite body samples were produced in the same manner as in Example 1 except that a plurality of phenoxy resin CFRP prepregs C of Preparation Example 3 were used, and the thickness of the CFRP layer 120 was 0.4 mm. The thickness of the resin layer 120a at the metal CFRP interface was 9 µm. The obtained two samples were cooled and then subjected to the bending test and the shear test.

Example 7

M-1 was used as the metal member 110, a plurality of polyamide resin CFRP prepregs D of Preparation Example 4 were used, and a sample of a metal-CFRP composite body for a bending test having a structure shown in FIG. 5 and the CFRP layer 120 with a thickness of 0.4 mm, and a sample of a metal-CFRP composite body for a shear test having a structure shown in FIG. 6 and the CFRP layer 120 with a thickness of 0.4 mm were pressed in a press machine heated to 230° C. at 3 MPa for 3 minutes for production. The thickness of the resin layer 120a at the metal CFRP interface was 6 µm. The obtained two samples were cooled and then subjected to the bending test and the shear test.

Example 8

Two metal-CFRP composite body samples were produced in the same manner as in Example 1 except that a plurality of crosslinked phenoxy resin CFRP prepregs E of Preparation Example 5 were used, and the thickness of the CFRP layer 120 was 0.4 mm. The thickness of the resin layer 120a at the metal CFRP interface was 7 µm. The obtained two samples were cooled and then subjected to the bending test and the shear test.

Example 9

A sample of a metal-CFRP composite body for a bending test having a structure shown in FIG. 5 and a sample of a metal-CFRP composite body for a shear test having a structure shown in FIG. 6 were pressed in a press machine heated to 200° C. at 3 MPa for 3 minutes for production in the same manner as in Example 1 except that M-1 was used as the metal member 110 roughened (10-point average roughness [Rz]: 3 µm) by sandpaper (#400), a plurality of phenoxy resin CFRP prepregs A of Preparation Example 1 were used, and the thickness of the CFRP layer 120 was 0.4 mm. The thickness of the resin layer 120a at the metal CFRP interface was 5 µm. The obtained two samples were cooled and then subjected to the bending test and the shear test.

Example 10

M-1 was used as the metal member 110, the crosslinked phenoxy resin CFRP prepreg E of Preparation Example 5 was used, and pressing was performed in a press machine heated to 120° C. at 3 MPa for 5 minutes, and thereby a flat laminate A of the metal-fiber-reinforced resin material having the same structure as that in (b) of FIG. 4 was produced. In the laminate A, the partially fused structure of the crosslinked phenoxy resin CFRP prepreg E was maintained.

Next, the laminate A was pressed in a press machine heated to 200° C. using a mold at 5 MPa for 5 minutes, and thereby a sample of a metal-CFRP composite body formed into the same shape as in (d) of FIG. 4 was produced. In this case, the thickness of the CFRP layer 120 was 0.4 mm, and in a part indicated by the reference numeral a in (d) of FIG. 4, the thickness of the resin layer 120a at the metal CFRP interface was 7 µm. After cooling, a test piece was cut out from the part a and subjected to the bending test.

Comparative Example 1

A plurality of phenoxy resin CFRP prepregs F of Preparation Example 6 were laminated and heated and pressed in a press machine heated to 200° C. at a pressure of 5 MPa for 5 minutes, and thereby a CFRP molded body with a thickness of 0.4 mm was produced. This was used as the CFRP layer 120, and pressed in a press machine heated to 200° C. at 3 to 5 MPa for 3 minutes together with the metal member 110 using M-1 directly, and thereby a sample of a metal-CFRP composite body for a bending test having a structure shown in FIG. 5 and a sample of a metal-CFRP composite body for a shear test having a structure shown in FIG. 6 were produced. The thickness of the resin layer 120a at the metal CFRP interface was 0.8 µm. The obtained two samples were cooled and then subjected to the bending test and the shear test.

Comparative Example 2

A sample of a metal-CFRP composite body for a bending test having a structure shown in FIG. 5 and a sample of a metal-CFRP composite body for a shear test having a structure shown in FIG. 6 were produced in the same manner as in Comparative Example 1 except that M-1 roughened (10-point average roughness [Rz]: 3 µm) by sandpaper (#400) was used as the metal member 110. The produced two samples were cooled and then subjected to the bending test and the shear test, but the metal member 110 and the CFRP layer 120 were easily separated.

Comparative Example 3

M-1 was used as the metal member 110, and a plurality of commercially available impregnated polyamide resin CFRP prepregs were used, and a sample of a metal-CFRP composite body for a bending test having a structure shown in FIG. 5 and the CFRP layer 120 with a thickness of 0.4 mm, and a sample of a metal-CFRP composite body for a shear test having a structure shown in FIG. 6 and the CFRP layer 120 with a thickness of 0.4 mm were pressed in a press machine heated to 230° C. at 3 MPa for 3 minutes for production. The thickness of the resin layer 120a at the metal CFRP interface was 0.5 µm. The obtained two samples were cooled and then subjected to the bending test and the shear test.

Comparative Example 4

A plurality of phenoxy resin CFRP prepregs B of Preparation Example 2 were laminated and heated and pressed in a press machine heated to 200° C. at a pressure of 5 MPa for 5 minutes, and thereby a CFRP molded body having a thickness of 0.4 mm was produced. In the CFRP molded body, the partially fused structure of the resin disappeared due to heat and the resin was completely impregnated into the CFRP. This was used as the CFRP layer 120 and pressed in a press machine heated to 120° C. at 3 MPa for 5 minutes together with the metal member 110 using M-1, and thereby a flat laminate A' of the metal-fiber-reinforced resin material having the same structure as that in (b) of FIG. 4 was produced.

Next, the laminate A' was preheated in a press machine heated to 200° C. for 1 minute and then pressed at 5 MPa for 5 minutes using a mold, and thereby a sample of a metal-CFRP composite body formed into the same shape as in (d) of FIG. 4 was produced. Here, since the sample was subjected to the bending test, when a test piece was cut out from a part indicated by the reference numeral a in (d) of FIG. 4 after cooling, the metal member 110 and the CFRP layer 120 were separated and thus measurement was not possible.

The results of Examples 1 to 10, and Comparative Examples 1 to 4 are shown in Table 1 to Table 3.

TABLE 1

|  |  |  | Example 1 | Example 2 | Example 3 | Example 4 | Example 5 |
|---|---|---|---|---|---|---|---|
| CFRP layer | Prepreg used | — | A | A | B | A | A |
|  | Type of matrix resin | — | A-1 | A-1 | A-1 | A-1 | A-1 |
|  | Type of fiber | — | UD | UD | Cloth | UD | UD |
|  | Production | — | Electrostatic coating | Electrostatic coating | Electrostatic coating | Electrostatic coating | Electrostatic coating |
|  | Film thickness | mm | 0.2 | 0.4 | 0.4 | 0.4 | 0.4 |
| CFRP/metal interface | Layer formation | — | Wet and spread | Wet and spread | Wet and spread | Wet and spread | Wet and spread |
|  | Type of resin | — | A-1 | A-1 | A-1 | A-1 | A-1 |
|  | Thickness | μm | 8 | 8 | 7 | 7 | 8 |
| Metal plate | Type of metal | — | M-1 | M-1 | M-1 | M-2 | M-3 |
|  | Thickness | mm | 0.4 | 0.4 | 0.4 | 0.2 | 1 |
|  | Roughening | — | None | None | None | None | None |
| Molding |  | — | Batch molding | Batch molding | Batch molding | Batch molding | Batch molding |
| Evaluation items of physical properties | Tg | ° C. | 83 | 83 | 83 | 83 | 83 |
|  | Void | — | O | O | O | O | O |
|  | Bending strength | MPa | 378 | 699 | 601 | 597 | 482 |
|  | Flexural modulus | GPa | 101 | 143 | 169 | 140 | 155 |
|  | Metal peeling off | — | O | O | O | O | O |
|  | Shear bonding | N/5 mm | 460 | 460 | 700 | 245 | 276 |

TABLE 2

|  |  |  | Example 6 | Example 7 | Example 8 | Example 9 | Example 10 |
|---|---|---|---|---|---|---|---|
| CFRP layer | Prepreg used | — | C | D | E | A | E |
|  | Type of matrix resin | — | A-1 | R-1 | A-1 + epoxy + crosslinking agent | A-1 | A-1 + epoxy + crosslinking agent |
|  | Type of fiber | — | UD | UD | Cloth | UD | Cloth |
|  | Production | — | Fluid bed | Electrostatic coating | Electrostatic coating | Electrostatic coating | Electrostatic coating |
|  | Film thickness | mm | 0.4 | 0.4 | 0.4 | 0.4 | 0.4 |
| CFRP/metal interface | Layer formation | — | Wet and spread | Wet and spread | Wet and spread | Wet and spread | Wet and spread |
|  | Type of resin | — | A-1 | R-1 | A-1 + epoxy + crosslinking agent | A-1 | A-1 + epoxy + crosslinking agent |
|  | Thickness | μm | 9 | 6 | 7 | 5 | 7 |
| Metal plate | Type of metal | — | M-1 | M-1 | M-1 | M-1 | M-1 |
|  | Thickness | mm | 0.4 | 0.4 | 0.4 | 0.4 | 0.4 |
|  | Roughening | — | None | None | None | Yes | None |
| Molding |  | — | Batch molding | Batch molding | Batch molding | Batch molding | Two steps |
| Evaluation items of physical properties | Tg | ° C. | 83 | 83 | 186 | 83 | 186 |
|  | Void | — | O | O | O | O | O |
|  | Bending strength | MPa | 643 | 632 | 520 | 575 | 498 |
|  | Flexural modulus | GPa | 133 | 124 | 126 | 138 | 149 |
|  | Metal peeling off | — | O | O | O | O | O |
|  | Shear bonding | N/5 mm | 473 | 427 | 532 | 506 | — |

TABLE 3

|  |  |  | Comparative Example 1 | Comparative Example 2 | Comparative Example 3 | Comparative Example 4 |
|---|---|---|---|---|---|---|
| CFRP layer | Prepreg used |  | — | F | F | Commercially available prepreg | B |
|  | Type of matrix resin |  | — | A-1 | A-1 | Polyamide | A-1 |
|  | Type of fiber |  | — | UD | UD | UD | Cloth |
|  | Production |  | — | Impregnation | Impregnation | Impregnation | Impregnation after electrostatic coating |
|  | Film thickness | mm | — | 0.4 | 0.4 | 0.4 | 0.4 |
| CFRP/metal interface | Layer formation |  | — | Exuding | Exuding | Exuding | Exuding |
|  | Type of resin |  | — | A-1 | A-1 | Polyamide | A-1 |
|  | Thickness | μm | — | 0.8 | — | 0.5 | — |
| Metal plate | Type of metal |  | — | M-1 | M-1 | M-1 | M-1 |
|  | Thickness | mm | — | 0.4 | 0.4 | 0.4 | 0.4 |
|  | Roughening |  | — | None | Yes | None | None |
| Molding |  |  | — | Batch molding | Batch molding | Batch molding | Two steps |
| Evaluation items of physical properties | Tg | ° C. |  | 83 | 83 | 55 | 83 |
|  | Void |  |  | O | x | O | O |
|  | Bending strength | MPa |  | 153 | Unmeasurable | 366 | Unmeasurable |
|  | Flexural modulus | GPa |  | 33 | Unmeasurable | 155 | Unmeasurable |
|  | Metal peeling off |  |  | X | X | X | X |
|  | Shear bonding | N/5 mm |  | 30 | Unmeasurable | 340 | — |

As shown in Table 1 to Table 3, Examples 1 to 10 as metal/fiber-reinforced resin material composite bodies produced according to the production method of the present invention had both superior mechanical strength and shear adhesive strength to Comparative Examples 1 to 4. In particular, there was a remarkable phenomenon in which, when samples of examples were subjected to the bending test, peeling off of the metal member 110 and the CFRP layer 120 did not occur like it did in the comparative examples, and voids were not generated in the CFRP layer 120 even if multiple layers were formed, and the results were significantly different from those of Comparative Examples 1 and 2 in which the prepreg F produced by a conventional method was used.

In addition, when the cross section of the metal/fiber-reinforced resin material composite bodies of Examples 1 to 10 was observed under a scanning electron microscope (SEM), it was confirmed that the resin layer 120a not containing carbon fibers was formed with a thickness of 5 to 10 μm at the interface between the metal member 110 and the carbon fiber substrate, and defects such as voids at the interface and inside the reinforcing fiber substrate made of carbon fibers could not confirmed.

While embodiments of the present invention have been described above in detail for the purpose of exemplification, the present invention is not limited to the embodiments. For example, while an example in which the reinforcing fiber substrate 101 is CFRP as the carbon fiber 101a has been exemplified in the above embodiment, the present invention can be applied to FRP in which, for example, a fiber material such as boron fibers, silicon carbide fibers, glass fibers, and aramid fibers is used as the reinforcing fiber substrate 101.

Priority is claimed on Japanese Patent Application No. 2017-073196, filed Mar. 31, 2017, the content of which is incorporated herein by reference.

REFERENCE SIGNS LIST 100, 100A Metal-CFRP composite body
101 Reinforcing fiber substrate
101a Carbon fiber
102 Fine powder
102A Partially fused structure
103 Resin-adhered fiber substrate
104 Prepreg
105 Matrix resin
110 Metal member
120 CFRP layer
120a Resin layer
130 Laminate
200 Mold

What is claimed is:

1. A method for producing a metal/fiber-reinforced resin material composite body including a metal member and a fiber-reinforced resin material which is laminated on at least one surface of the metal member, wherein the fiber-reinforced resin material includes a reinforcing fiber substrate and a resin including a thermoplastic resin impregnated into the reinforcing fiber substrate as a matrix resin, the method comprising:

a step A: forming a prepreg in which a partially fused structure of the resin including the thermoplastic resin is formed on at least one surface of the reinforcing fiber substrate; and a step B: performing a heat and pressure treatment when the partially fused structure of the prepreg is brought into contact with a surface of the metal member; and at the same time, the resin including the thermoplastic resin is completely melted and wet and spreads on the surface of the metal member and the resin including the thermoplastic resin is impregnated into the reinforcing fiber substrate, thereby forming the metal/fiber-reinforced resin material composite body, wherein the fiber-reinforced resin material and the metal member are bonded to form the metal/fiber-reinforced resin material composite body.

2. The method for producing the metal/fiber-reinforced resin material composite body according to claim 1,
wherein the step A of forming the prepreg includes a step a and a step b:
the step a comprising: forming a resin-adhered fiber substrate by adhering a fine powder of the resin including the thermoplastic resin that is a solid at room temperature to at least one surface of the reinforcing fiber substrate by a powder coating method; and
the step b comprising: performing a heat treatment on the resin-adhered fiber substrate, and after the fine powder of the resin including the thermoplastic resin is incompletely melted, solidifying the resin including the thermoplastic resin to form the prepreg having the partially fused structure.

3. The method for producing the metal/fiber-reinforced resin material composite body according to claim 2, wherein the heat treatment in the step b is performed in a temperature range of 100 to 400° C. for 30 seconds to 3 minutes.

4. The method for producing the metal/fiber-reinforced resin material composite body according to claim 3, wherein an average particle size of the fine powder of the resin including the thermoplastic resin is in a range of 10 to 100 μm.

5. The method for producing the metal/fiber-reinforced resin material composite body according to claim 2, wherein the fine powder of the resin including the thermoplastic resin is adhered to the reinforcing fiber substrate by a powder coating method.

6. The method for producing the metal/fiber-reinforced resin material composite body according to claim 5, wherein an average particle size of the fine powder of the resin including the thermoplastic resin is in a range of 10 to 100 μm.

7. The method for producing the metal/fiber-reinforced resin material composite body according to claim 2, wherein an average particle size of the fine powder of the resin including the thermoplastic resin is in a range of 10 to 100 μm.

8. The method for producing the metal/fiber-reinforced resin material composite body according to claim 1,
wherein, in the prepreg having the partially fused structure, 10 weight % or more of the resin including the thermoplastic resin is adhered in a range of 0 to 50% in a thickness direction with respect to a thickness of the reinforcing fiber substrate.

9. The method for producing the metal/fiber-reinforced resin material composite body according to claim 1, wherein an air permeability of the prepreg in a thickness direction is in a range of 500 to 1,000 $cc/cm^2/sec$ when a thickness is 40 to 200 μm.

10. The method for producing the metal/fiber-reinforced resin material composite body according to claim 1,
wherein, in the step B, a layer of resin including the thermoplastic resin having a thickness of 20 μm or less and a fiber content of 5 weight % or less is formed between the surface of the metal member and the reinforcing fiber substrate.

11. The method for producing the metal/fiber-reinforced resin material composite body according to claim 1, wherein the heat and pressure treatment in the step B is performed in a temperature range of 100 to 400° C. and a pressure range of 3 MPa or more, for 3 minutes or longer.

12. The method for producing the metal/fiber-reinforced resin material composite body according to claim 1, wherein the heat and pressure treatment in the step B causes three-dimensional molding.

13. The method for producing the metal/fiber-reinforced resin material composite body according to claim 12, wherein the heat and pressure treatment in the step B is in a temperature range of 180 to 240° C., and causes the resin including the thermoplastic resin to crosslink to form a crosslinked cured product.

14. The method for producing the metal/fiber-reinforced resin material composite body according to claim 13, wherein the resin including the thermoplastic resin has a Tg before crosslinking of 150° C. or lower, and a Tg of 160° C. or higher after crosslinking.

* * * * *